US010816101B2

(12) United States Patent
Bais

(10) Patent No.: US 10,816,101 B2
(45) Date of Patent: Oct. 27, 2020

(54) FLEXIBLE SELF-LOCKING VALVE

(71) Applicant: Baseline Design Innovations Inc., Victoria OT (CA)

(72) Inventor: John Michael Bais, Winnipeg (CA)

(73) Assignee: BASELINE DESIGN INNOVATIONS INC., Victoria, BC (CA)

( * ) Notice: Subject to any disclaimer, the term of this patent is extended or adjusted under 35 U.S.C. 154(b) by 141 days.

(21) Appl. No.: 16/102,012

(22) Filed: Aug. 13, 2018

(65) Prior Publication Data
US 2019/0049027 A1    Feb. 14, 2019

Related U.S. Application Data

(60) Provisional application No. 62/544,069, filed on Aug. 11, 2017.

(51) Int. Cl.
| F16K 15/20 | (2006.01) |
| A63H 33/00 | (2006.01) |
| A47C 27/08 | (2006.01) |
| F16K 15/14 | (2006.01) |
| A63H 23/10 | (2006.01) |
| B63B 7/08 | (2020.01) |
| B63B 32/00 | (2020.01) |
| B63B 34/00 | (2020.01) |
| B63B 34/20 | (2020.01) |
| B63B 34/50 | (2020.01) |

(52) U.S. Cl.
CPC .......... *F16K 15/202* (2013.01); *A47C 27/081* (2013.01); *A63H 23/10* (2013.01); *A63H 33/00* (2013.01); *F16K 15/147* (2013.01); *B63B 7/08* (2013.01); *B63B 32/00* (2020.02); *B63B 34/00* (2020.02); *B63B 34/20* (2020.02); *B63B 34/50* (2020.02)

(58) Field of Classification Search
CPC .... F16K 15/202; F16K 15/147; F16K 15/144; A47C 27/081; A63H 23/10; A63H 33/00; B63B 34/00; B63B 34/20; B63B 34/50; B63B 32/00; B63B 7/08; A61F 2/2412
USPC ......... 137/223, 225, 512, 512.4, 513.3, 846, 137/847, 849, 850, 614.2, 455, 843, 852, 137/853, 859; 251/212
See application file for complete search history.

(56) References Cited

U.S. PATENT DOCUMENTS

| 2,423,890 | A | * | 7/1947 | Hurt | ...................... A47C 27/081 446/226 |
| 3,387,624 | A | * | 6/1968 | Soucy | ................ B65D 47/2037 137/847 |
| 5,727,593 | A | * | 3/1998 | Duer | ......................... E03F 7/04 137/846 |
| 8,978,693 | B2 | * | 3/2015 | Frayne | .................... F16K 15/20 137/512 |
| 2018/0044066 | A1 | * | 2/2018 | Lee | ...................... A47C 27/081 |

* cited by examiner

Primary Examiner — Justin M Jonaitis

(57) ABSTRACT

An inflatable object has a curved section, and an improved valve featuring a flexible chute that has an inner edge connected to said inflatable object and is rollable and unrollable between a rolled-up closed position and an unrolled open position. The inner edge is connected to said inflatable object along said curved section at a location and orientation operable to use pressure inside said inflatable object to resist unrolling of said flexible chute from the rolled-up closed position, thereby imparting a self-locking functionality to the valve.

17 Claims, 27 Drawing Sheets

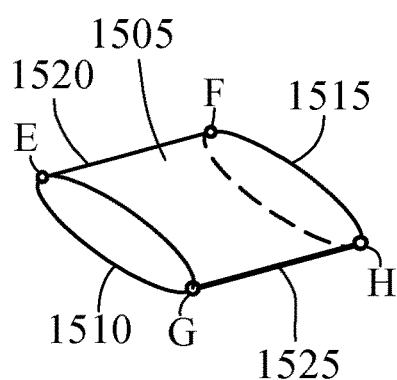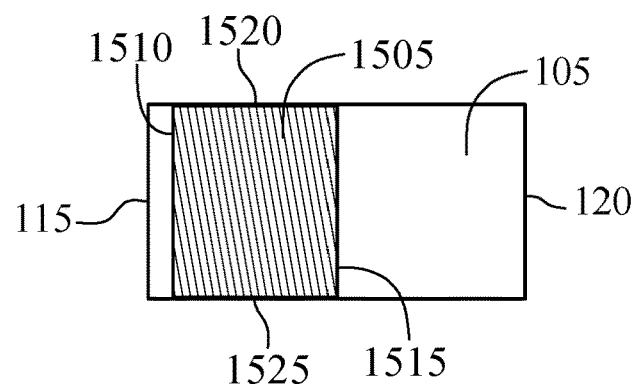
FIG. 15A  FIG. 15B
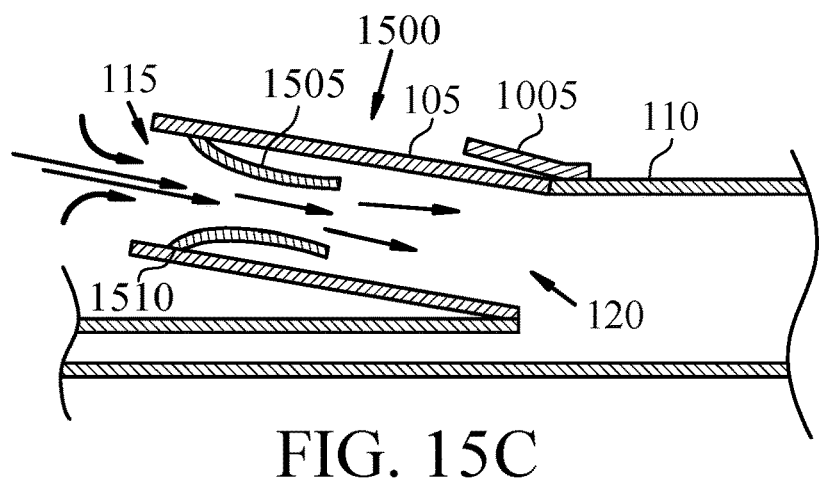
FIG. 15C
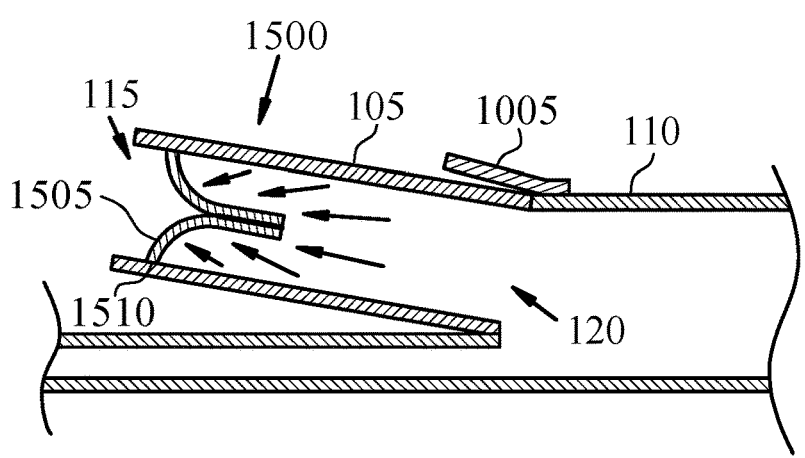
FIG. 15D

FLEXIBLE SELF-LOCKING VALVE

BACKGROUND

The present disclosure relates to valves for inflatable objects. An inflatable object can be filled with a fluid such as a gas or liquid. Traditional valve openings for inflatable objects can cause detrimental effects and limitation on user convenience and serviceability. Traditional valves either have small openings causing slow inflation and deflation, or have larger openings that resulting in heavy, bulky, and rigid structures. These conflicting attributes can work against each other. Even larger traditional valve openings do not allow adequate access to the inside surface of an inflatable object. Unwanted items can get trapped inside the inflatable object during normal use such as moisture, bacteria, sand, rocks, sea salt, dirt, dust, lint, etc. Moisture can cultivate bacterial leading to material break down and unsanitary conditions. When an inflatable object is deflated and packed, trapped items can tear and puncture the material from the inside.

Traditional valves with larger openings are heavy, bulky, and rigid to handle the increased pressure placed on them due to the larger openings. These are all detrimental attributes for inflatable objects since advantages of inflatable objects include being lightweight and having a small packing size for ease of storage. Also rigid parts on inflatable objects can cause damage during deflated storage and transportation resulting in punctures and/or tears. Therefore, inflatable object manufacturer have long sought a means it increase the size of valve openings on inflatable objects without adding weight and rigid structures.

U.S. Pat. No. 1,944,466 to Rubin, U.S. Pat. No. 2,423,890 to Hurt, and U.S. Pat. No. 8,978,693 to Fryner, as well as products such as Lamzac, Vetroo, WindPouch, etc. all show how large openings can improve the flow of air into or out of an inflatable object. The downside with all of these is how the large openings are closed. In all cases a seal is created by the user bringing the edges of the opening together and rolling them towards the inflatable object. The pressure inside the inflatable objects tries to unroll the large openings and the larger the opening the more force it has to hold back. This limits the overall size of the opening and the pressure the inflatable object can be inflated to. Also the user must hold the rolled valve at all times to prevent it from unrolling while simultaneously connecting fasteners to hold it in place. This can be cumbersome and limit the fastener options. This also becomes increasingly difficult as internal pressure increases. The rolled valves can be secured in one of two methods. In the first method the roll is held closed with sturdy fasteners. Even with low pressure inflation, these fasteners are either heavy and/or create stress concentrations. The other method has the user bend the rolled valve into a circle and connect fasteners attached to the tips of the roll to complete the circle. These secure closed positions cause distortion to the surface of the inflatable object limiting practical application by causing stress concentrations and do not lend themselves to a clean surface for aerodynamics or aesthetic appeal.

U.S. Pat. No. 8,978,693 to Fryner shows how to reverse the air flow through a one-way valve to rapidly deflate an inflatable mattress. This is accomplished by the user reaching into the inflation chamber to invert an inner check valve through an outer check valve. This limits the size of the valve to be big enough for the user to fit their arm inside the valve, but small enough that their arm can reach the inner check valve. Also, inflation resistance is increased as a result of the valve requiring at least two check valves for rapid deflation, one invertible and one non-invertible.

In conclusion, insofar as I am aware, no valve for inflatable objects formerly developed allows the benefits of a large opening without at least one of the following issues;
(1) heavy
(2) bulky
(3) requires rigid structures
(4) requires sturdy fasteners
(5) distorts the surface of the inflatable object
(6) causes stress concentration
(7) cannot accommodates a large range of valve sizes
(8) Allow high volume low pressure inflation and low volume high pressure inflation

SUMMARY

An improved valve for inflatable objects, has a flexible chute that is connected along an inside edge along a curved section of an inflatable object. Inflatable objects may include, but are not limited to, pool floats, inflatable toys, traction kites, rafts, towable water toys, inflatable mattresses, inflatable furniture, inflatable paddle boards, inflatable kayaks, inflatable structures, etc. A chute provides a large entry/exit point to an inflatable object that allows rapid inflation/deflation. In a closed position, pressure inside the inflatable object will cause a chute to bind in a closed position and resist opening.

To inflate, a stream of fluid is projected towards an outside opening of a valve chute. A stream of fluid can originate from a distance away from the outside opening while leaving the area surrounding the outside opening unshielded. A stream of fluid may be produced by various sources such as a user's breath, moment of user's hand, manual pump, hair dryer, fan, air tank, bellows, etc. Fluid can also be forced into an outside opening by the wind, fluid current, or by a user pulling the outside opening through the fluid. A user can quickly collapse the outside opening to prevent fluid from escaping when the desired level of inflation is reached or during interruptions in a stream of fluid.

Some embodiments may include one or more one-way valves that allow fluid to pass freely through a chute in one direction and restrict fluid movement in an opposite direction. These embodiments can be oriented to prevent fluid from escaping an inflatable object during inflation.

Some embodiments that include a one-way valve may be coupled with an adaptor that allows rapid inflation in one configuration and high pressure inflation in another configuration. Said adaptor could include a holder and an inflation tube. Said holder when coupled with an outside opening of a chute could hold the outside opening in a wide open position. Said holder could also orient the inflation tube so that when fluid flows through the tube it will be directed towards the outside opening of the chute. In the rapid inflation configuration fluid flowing through the adaptor will recreate the condition previously described. In the high pressure inflation configuration the adapter will bypass a seal created by the one-way valve and directly inflate the chute.

To close into a secure configuration, a user completely rolls up a chute starting from an outside edge and rolling towards an inflatable object. In a closed configuration, a chute will be seen going from a connection on an inflatable object and passes over top of a rolled portion of the chute before passing between the rolled chute and the inflatable object. Some embodiments may include a cover that allows the chute to be rolled in both and upwards or downwards roll to achieve a self-locking closed position. In these embodiments a chute may travel from a connection on an inflatable object and pass between the rolled chute and the inflatable object before going over top of a rolled portion of the chute.

To deflate, a chute can be unrolled into an open position. If one or more one-way valves are included to prevent fluid from escaping though the chute, then the chute can be places in a straight, outward rolled or inward rolled, inverted position. To invert, the outside opening of a chute is pulled/rolled over top of the rest of the chute. Then the one-way valve will no longer prevent fluid from escaping the inflatable object. This allows rapid deflation of an inflatable object.

Accordingly, several advantages are to provide an improved valve for inflatable objects that is flexible, compact, low profile, lightweight, and allows an inflatable object to have a large opening that is self-locking in a closed position. Still further advantages will become apparent from a study of the following description and the accompanying drawings.

BRIEF DESCRIPTION OF THE DRAWINGS

FIG. 15A-15J
illustrate views of a valve embodiment with a one-way fluid flow valve embodiment;

DETAILED DESCRIPTION

Various valve embodiments are discussed in detail below. While specific implementations are discussed, it should be understood that this is done for illustration purposes only. A person skilled in the relevant art will recognize that other components and configurations may be used without parting from the spirit and scope of the disclosure.

The following description of various embodiments relates to a flexible, compact, low profile, and lightweight valve that allows an inflatable object to have a large opening. When valve embodiments are in the closed position, pressure inside the inflatable object will cause the valve to bind in the closed position and resist opening.

Figure 1A:
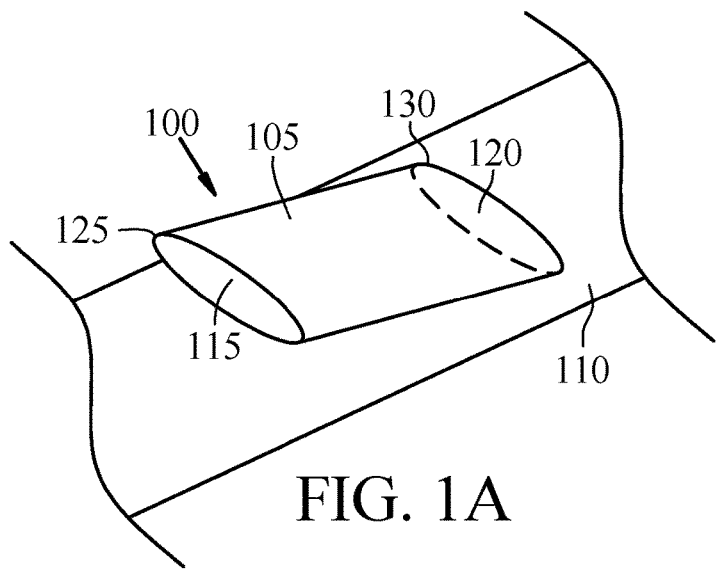
FIG. 1A-1C
illustrate perspective views of an exemplary embodiment of a valve attached to an inflatable object from an open position to a closed position.

FIG. 1A shows an exemplary embodiment of valve arrangement 100, in an open position, designed as an entry/exit point to inflatable object 110 through chute 105.

As illustrated, chute 105 is a flexible tube that includes outside opening 115, inside opening 120, outside edge 125, and inside edge 130. Chute 105 may be connected to inflatable object 110 along inside edge 130 with any technique known to the art such as thermal bonding, glue, stiches, tape, etc. The opening in inflatable object 110 that is connected to inside edge 130 may be a straight cut or a thin long slot. Chute 105 may be made of a similar material as inflatable object 110, such as; nylon, vinyl, rubber, polyurethane, etc. Some embodiments may also include a traditional inflation valve connected to inflatable object 110.

To inflate inflatable object 110 through valve arrangement 100 a stream of fluid is projected towards outside opening 115. The stream of fluid can originate from a distance away from outside opening 115 while leaving the area surrounding outside opening 115 unshielded. The stream of fluid may be produced by various sources such as a user's breath, moment of user's hand, manual pump, hair, dryer, fan, air tank, bellows, etc. Fluid can also be forced into outside opening 115 by the wind, fluid current, or by the user pulling outside opening 115 through a fluid. The user can quickly collapse outside opening 115 to prevent fluid from escaping when the desired level of inflation is reached or during interruptions in the flow of fluid.

By projecting a stream of fluid towards outside opening 115 more fluid enters the inflatable object 110 then is projected at outside opening 115 in two ways. First, the stream of fluid produces a low pressure zone and fluid surrounding outside opening 115 is drawn into outside opening 115. Second, the momentum from the flowing fluid mass through chute 105 creates suction to draw in more fluid surrounding outside opening 115. Therefore, to increase the amount of fluid being pulled into outside opening 115, fluid should be allowed to flow into inflatable object 110 with the lease amount of resistance. Abrupt changes in direction of the fluid flow create pressure spikes and prevent extra fluid from being pulled into outside opening 115.

Figure 1B:
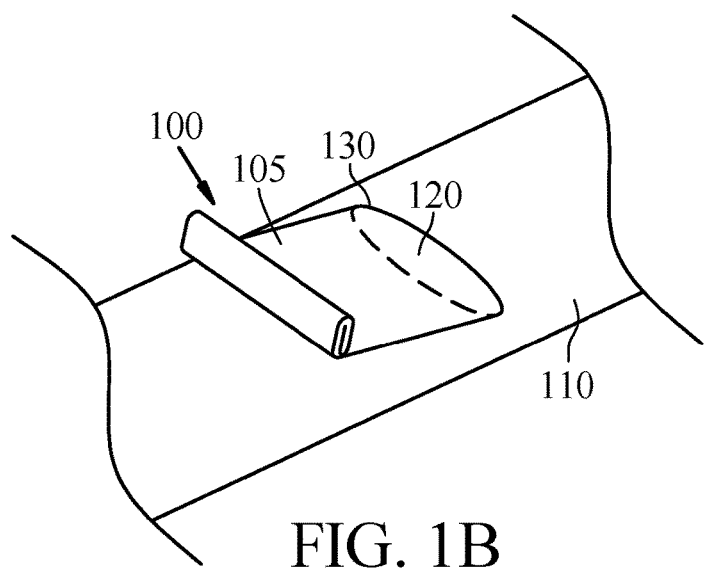
Figure 1C:
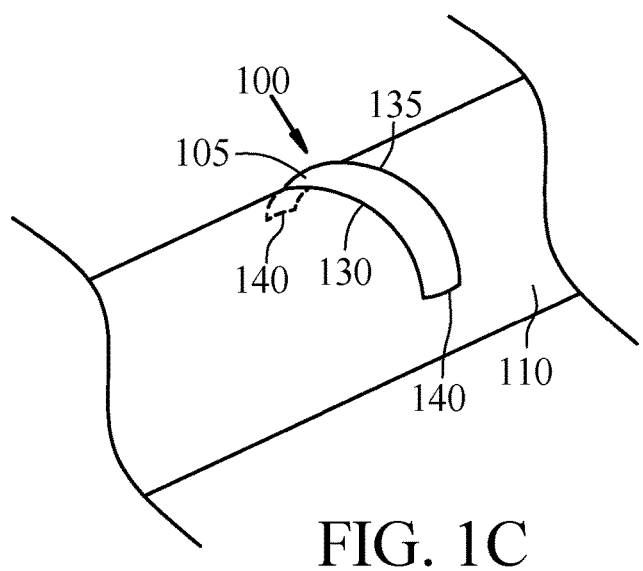
Figure 2A:
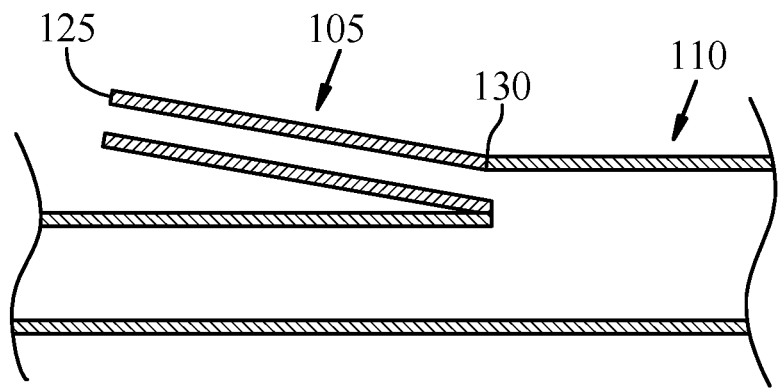
FIG. 2A-2D
illustrate sectional views of a valve embodiment being rolled into a closed configuration with a upward roll.
Figure 2B:
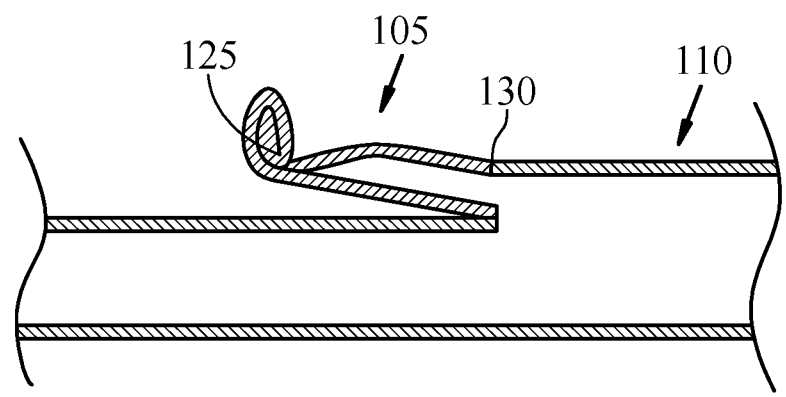
Figure 2C:
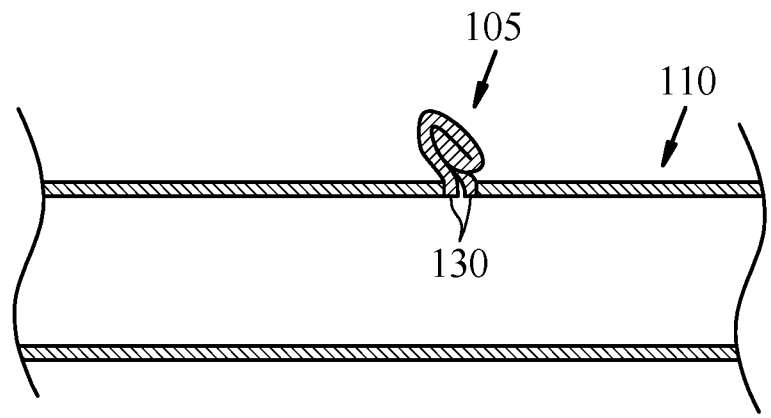
Figure 2D:
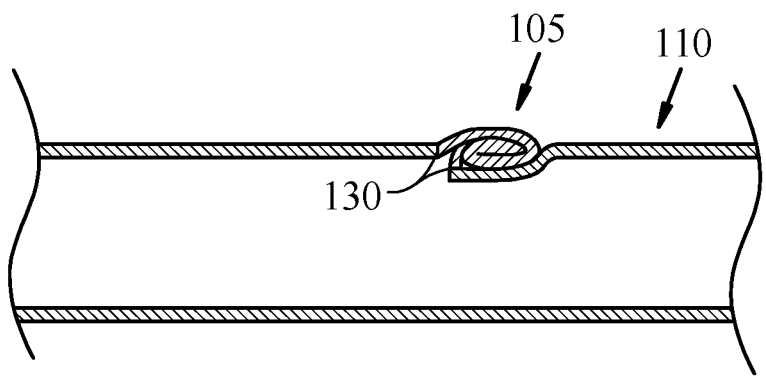
Figure 3A:
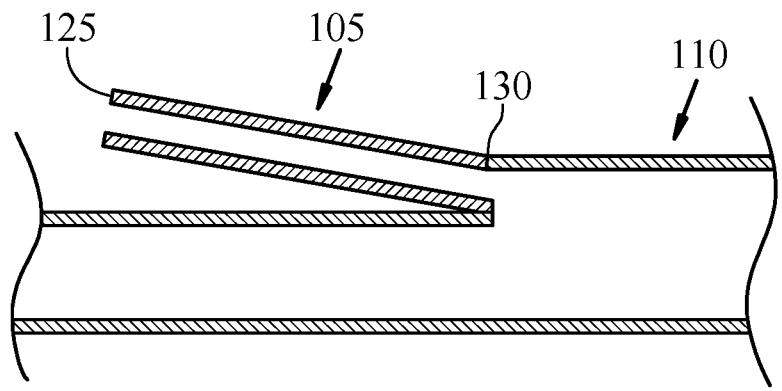
FIG. 3A-3C
illustrate sectional views of a valve embodiment being rolled into a closed configuration with a downward roll.
Figure 3B:
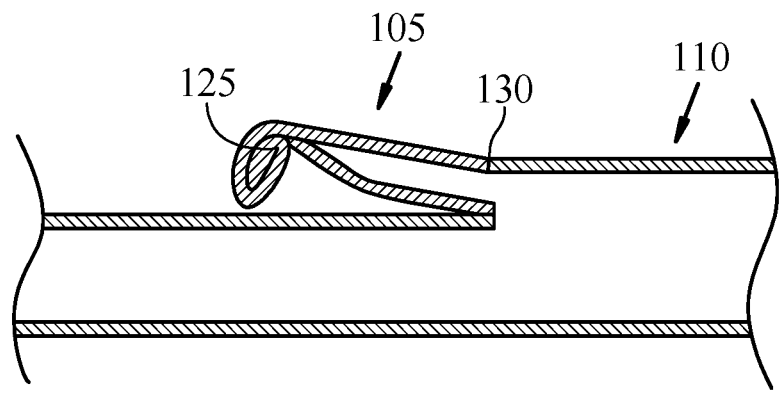
Figure 3C:
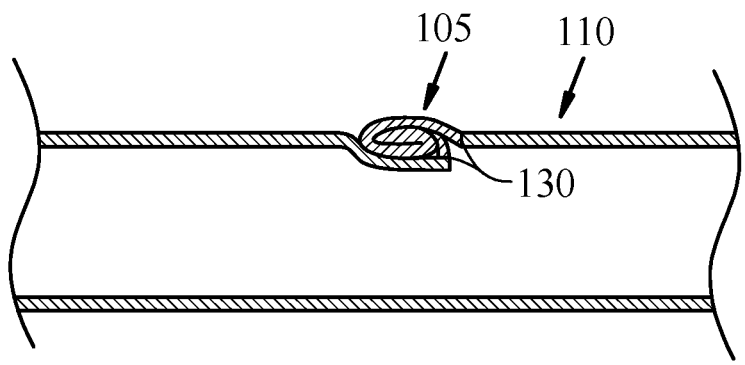

FIG. 1C shows a perspective view of valve arrangement 100 in a closed configuration having rolled edge 135, and two rolled sides 140. To close valve arrangement 100 into a secure configuration, a user completely rolls chute 105 starting from outside edge 125 and rolling towards inside edge 130 (FIG. 1B). A user can either roll chute 105 in an upwards roll by folding outside edge 125 away from inflatable object 110 (FIG. 2A-2D) or by folding outside edge 125 towards inflatable object 110 in a downwards roll (FIG. 3A-3C). When valve arrangement 100 is in the secure configuration, chute 105 will go from inside edge 130 and pass over top of the rolled portion of chute 105 towards rolled edge 135, shown in FIG. 2D and FIG. 3C.

Embodiments of the disclosed invention bind in the closed position and resist opening when there is pressure inside the inflatable object. This result can be attributed to the location and orientation of the connection point between the chute embodiment and the surface of the inflatable object the chute is attached to.

Figure 4A:
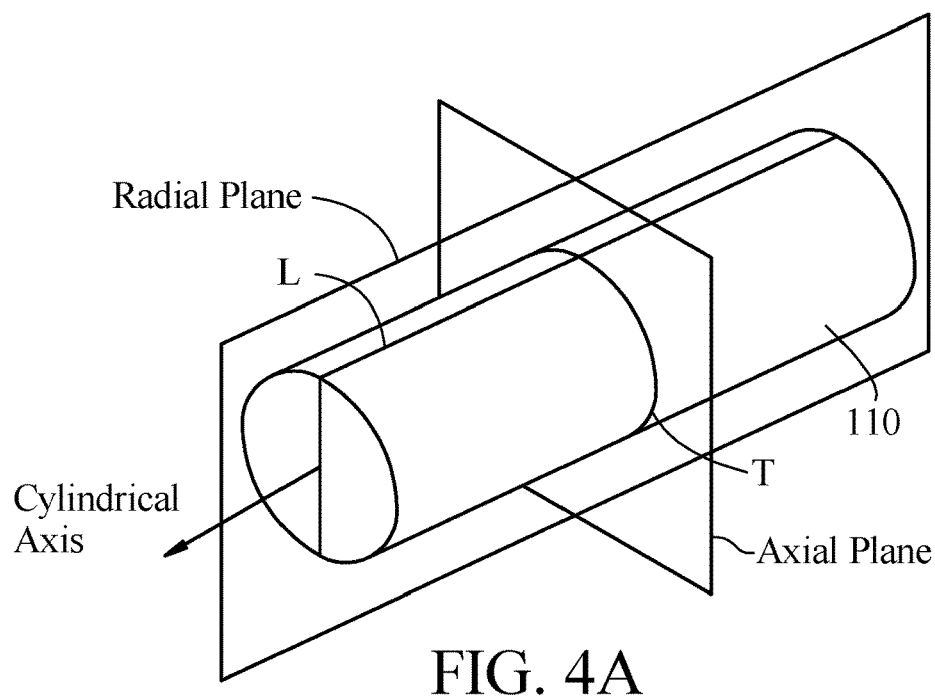
FIG. 4A-4C
illustrate views that set up relative planes for inflatable object surfaces.
Figure 4B:
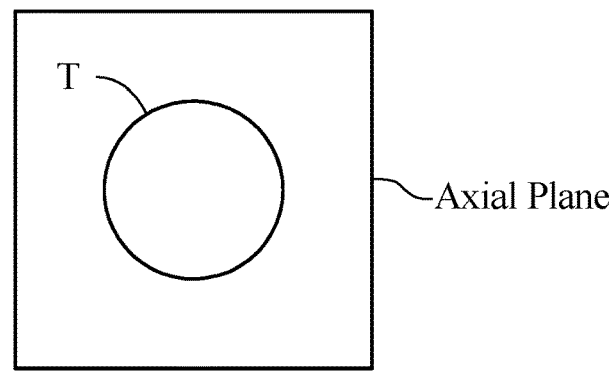
Figure 4C:
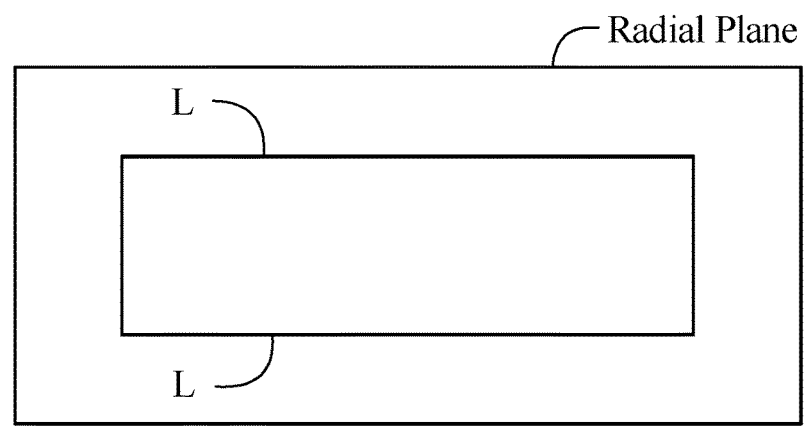

FIG. 4A-4C are used to define a relative planes for the surface of an inflatable object.

This is used to discuss how elements of the disclosed invention are located and oriented relative to the surface of an inflatable object. Inflatable objects may have complex surface geometry, but each section of the surface can be simplified and represented with basic shapes such as cylinders, spheres, cones, tori, etc. The following definitions apply when inflatable object 110 is in an inflated state.

FIG. 4A shows a cylindrical section of inflatable object 110 with a cylindrical axis, axial plane, and radial plane. The axial plane is perpendicular to the cylindrical axis. The intersection between the curved section of the surface of inflatable object 110 and an axial plane create a curved 'T' line (FIG. 4B). The radial plane intercepts the length of the cylindrical axis. The interception between the curved surface of inflatable object 110 and a radial plane creates 'L' lines that are parallel to the cylindrical axis (FIG. 4C).

Figure 5:
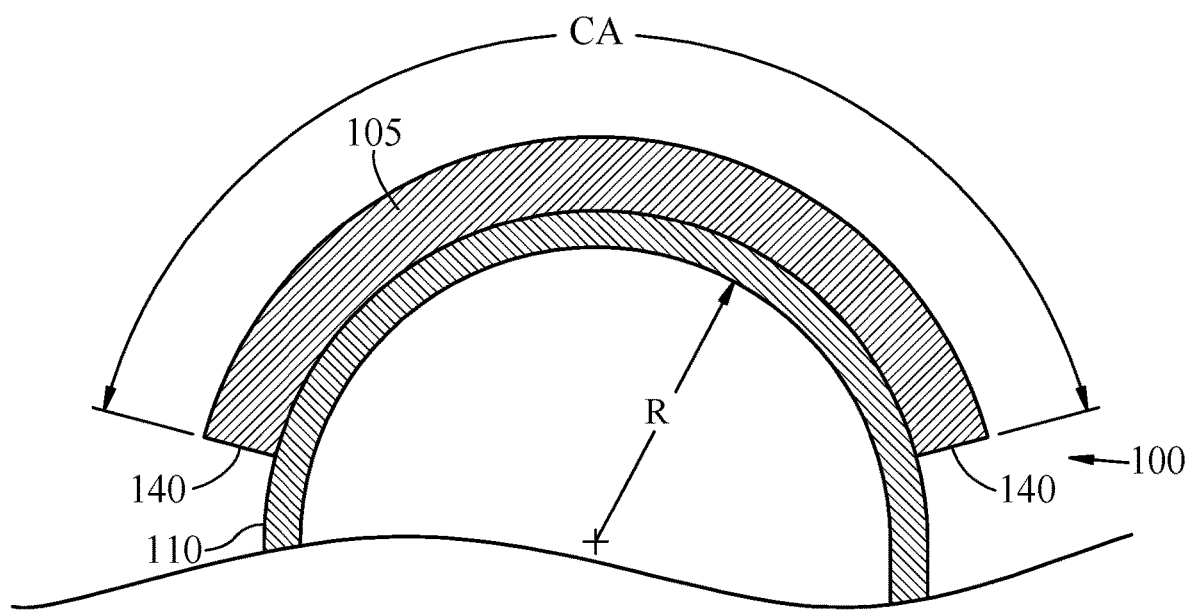
FIG. 5
illustrates a cross sectional view on an axial plane of a valve embodiment in the closed position.

FIG. 5 shows a cross sectional view, on an axial plane, through valve arrangement 100 in a closed position. Central angle 'CA' is determined by the width of chute 105 as measured from one rolled side 140 to the other rolled side 140 along the surface of inflatable object 110 at a radius 'R'. When central angle 'CA' is of adequate size for that embodiment chute 105 will bind in the closed position and resist opening.

Figure 6:
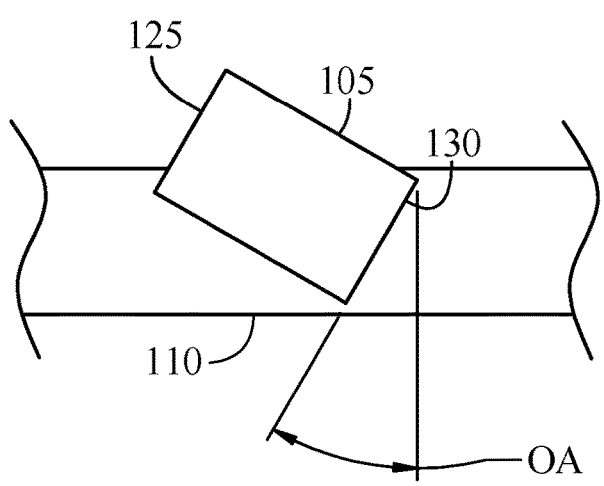
FIG. 6
illustrates the orientation of valve embodiment relative to inflatable objects with an offset angle.

An embodiment in FIG. 6 shows a connection point between chute 105 and inflatable object 110 along inside edge 130 that is offset from an axial plane by offset angle 'OA'. This forces rolled chute 105 into an ellipse shaped arc when inflatable object 110 is pressurized. As offset angle 'OA' decreases inside edge 130 approaches a circular arc shape following a 'T' line, similar to valve arrangement 100. As offset angle 'OA' increase inside edge 130 approaches an line. As offset angle 'OA' is reduced to an adequate angle for that embodiment chute 105 will bind in the closed position and resist opening. Expressed differently, the offset angle 'OA' between the axial plane and a connection plane in which the inside edge of the chute is connected to the curved surface of the object around the opening therein can be as little as zero degrees, in which case the connection plane is coincident with the axial plane and perpendicular to the cylindrical axis. Alternatively, the connection plane can reside at an oblique offset angle between zero and ninety degrees, at higher ranges of which the connection plane is nearly but not quite parallel to the cylindrical axis. In other words, offset angle can be zero, or a non-zero angle of less than ninety degrees. Accordingly, the connection plane can be perpendicular to a reference axis around which the curved surface of the objects is curved, or can be obliquely oriented relative to this reference axis. In either event, the elongated cut or slot-shaped opening in the curved surface of the inflatable object, and thus the connection around which the inside edge of the chute is joined to the curved surface of the inflatable object, lie perpendicularly or obliquely transverse to the reference axis.

Figure 7A:
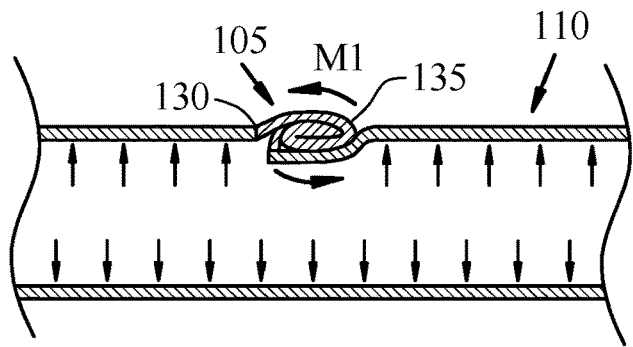
FIG. 7A-7C
illustrate effects that cause valve embodiments to bind in the closed position and resist opening.
Figure 7B:
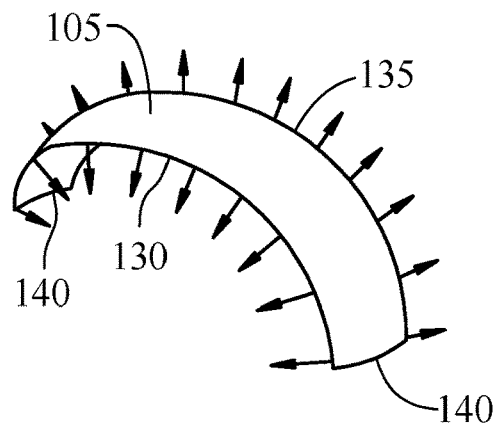
Figure 7C:
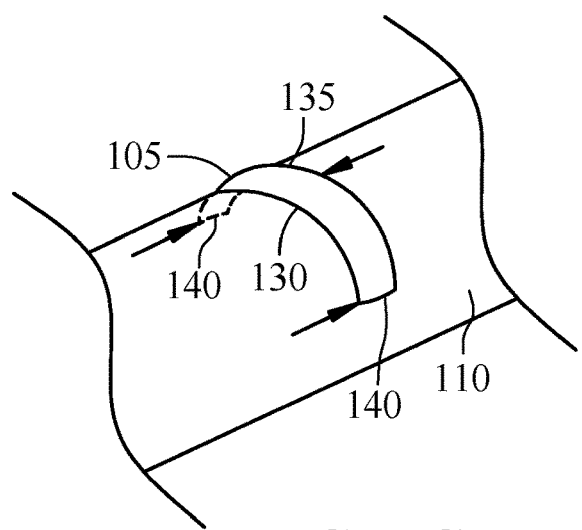

FIG. 7A shows a sectional view, on a radial plane, of chute 105 in a closed position. Pressure inside inflatable object 110 creates a distributed torque 'M1' that acts in radial planes all along rolled chute 105. FIG. 7B shows a perspective view of rolled chute 105 with inflatable object 110 hidden. FIG. 7B illustrates how distributed torque 'M1' tries to lift rolled edge 135 away from the surface of inflatable object 110 and pushes inside edge 130 into inflatable object 110. This creates compression along the area closest to inside edge 130 and tension around rolled edge 135. These distributed forces within the arc shape allow rolled chute 105 to resist buckling. FIG. 7C simulates how the summation of forces act on rolled chute 105. The middle of rolled chute 105 tries to move towards inside edge 130 and pushes against inflatable object 110. Both rolled sides 140 try to move away from inside edge 130 but are retained by the connection between inflatable object 110 and inside edge 130. The result is that rolled chute 105 binds in the closed position and resist unrolling.

Valve arrangement 100 can be used to improve serviceability and maintenance. Unwanted items can get inside inflatable object 110 and may include moisture, bacteria, sand, rocks, sea salt, dirt, dust, lint, etc. With chute 105 in the open position unwanted items can be poured and shook out. Alternatively, inflatable object 110 can be completely/partially inverted through chute 105. When in an inverted state unwanted items are easily knocked off the inside surface, moisture can dry, and the inside surface can be cleaned. When inflatable object 110 is in an inverted position repairs can be made to the inside surface of the inflatable object 110. Some inflatable objects may also include items intentionally placed inside. Intentional items inside inflatable object 110 can be added, removed, or serviced either through valve arrangement 100 or when inflatable object 110 is inverted.

Some valve embodiments may include a means to fasten the embodiment in the closed configuration. A fastening means can add redundancy to a valve embodiment in the closed position, as well as increase geometric stability the inflatable object to resist bending. It can also protect the rolled chute from getting pulled open if contacted by external objects. Since the valve is self-locking the fastening means do not have to hold back the full load created from the pressure in the inflatable object.

Figure 8:
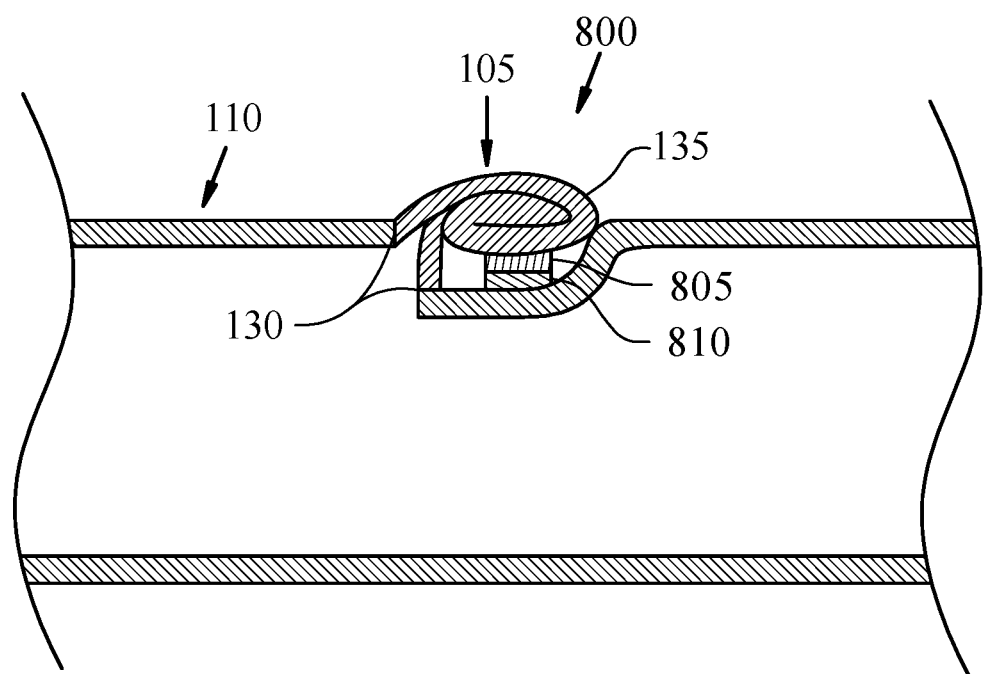
FIG. 8
illustrate exemplary embodiment of a valve with attachment means.

FIG. 8 shows a sectional view of valve arrangement 800 with chute 105 in the closed position with attachment elements 805 and 810. Here attachment element 805 is connected to the bottom of rolled chute 105 while attachment element 810 is connected to inflatable object 110, in a location that aligns with attachment element 805. Attachment elements 805 and 810 may span a portion, many portions, or the entire length across rolled chute 105. Attachment elements 805 and 810 may be any type of attachment element known in the art such as hook and loop, snaps, buttons, buckles, magnets, zipper, etc.

Figure 9:
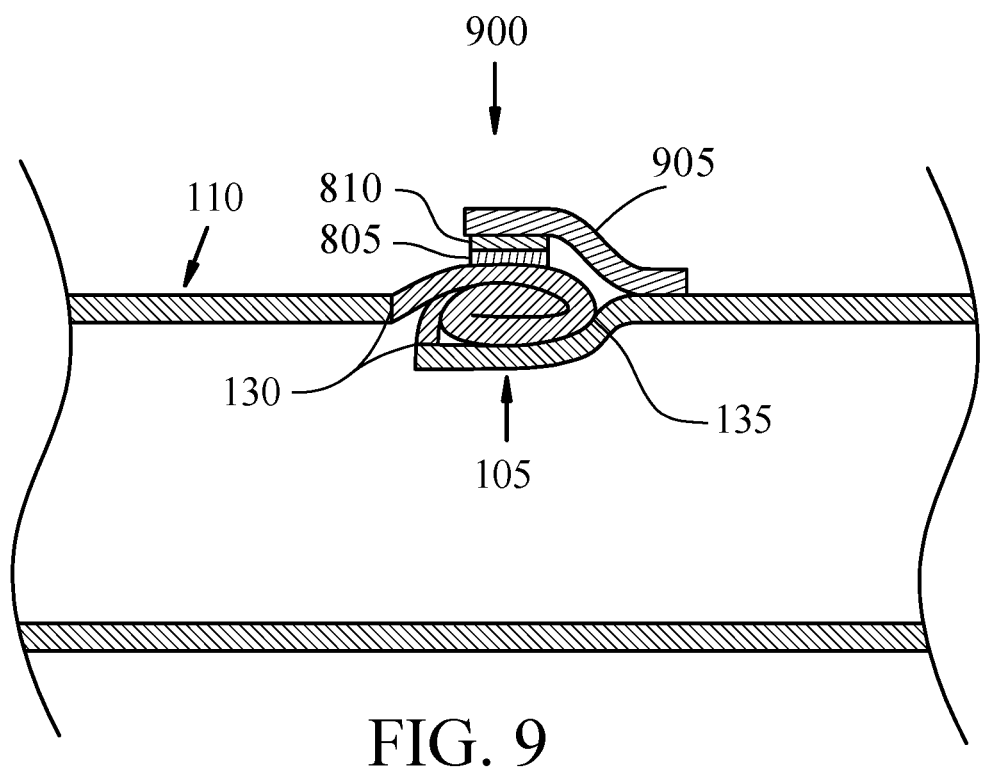
FIG. 9
illustrate exemplary embodiment of a valve with attachment means.

FIG. 9 shows a sectional view of valve arrangement 900 with chute 105 in the closed position with attachment element 805, attachment element 810, and connection element 905. Connection element 905 may be made from a similar material to inflatable object 110 or any other flexible sheet material known in the art. Here attachment element 805 is connected to the top of rolled chute 105. Connection element 905 is connected on one side to inflatable object 110, using any method known to the art, and on the other side to attachment element 810. Attachment element 810 is connected to connection element 905 in a location that aligns with attachment element 805. Connection element 905 can also protect rolled edge 135 from catching or snagging on other objects.

Figure 10A:
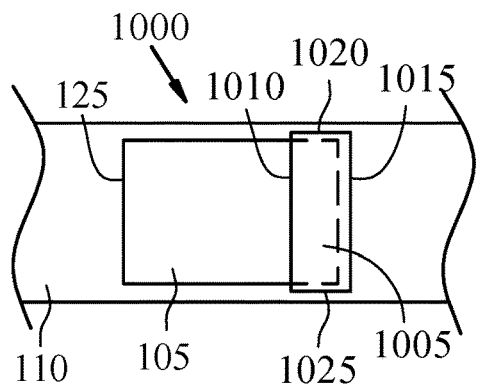
FIG. 10A-10F
illustrate views of a valve embodiment with a pocket cover.

Some valve embodiments may include a cover that goes over top of rolled chute 105 in the closed position. FIG. 10A-10F show valve arrangement 1000, which is similar to valve arrangement 100, but with the addition of cover element 1005. Cover element 1005 may be made of a similar material to inflatable object 110 or any other flexible sheet material known in the art. FIG. 10A shows cover element 1005 with front edge 1010, back edge 1015, side edge 1020, and side edge 1025. Cover element 1005 may be connected to inflatable object 110 along back edge 1015, side edge 1020, and side edge 1025 with any technique known to the art such as thermal bonding, glue, stiches, tape, etc. Cover element 1005 has sufficient length along side edge 1020 and side edge 1025 to allow rolled chute 105 to be rolled inside the pocket created by cover element 1005.

Figure 10B:
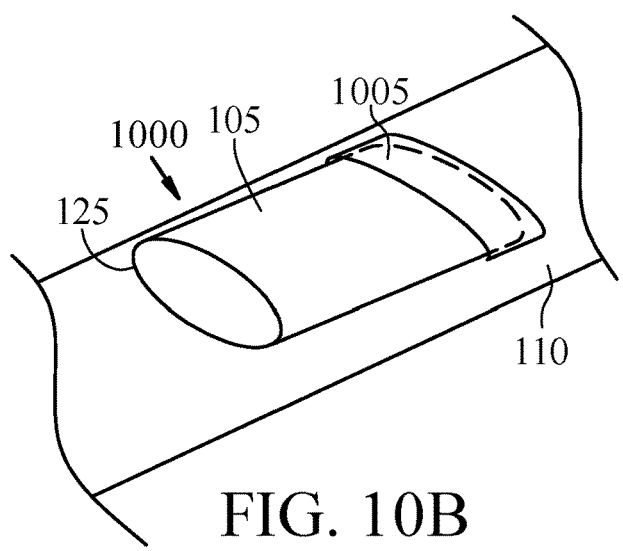
Figure 10C:
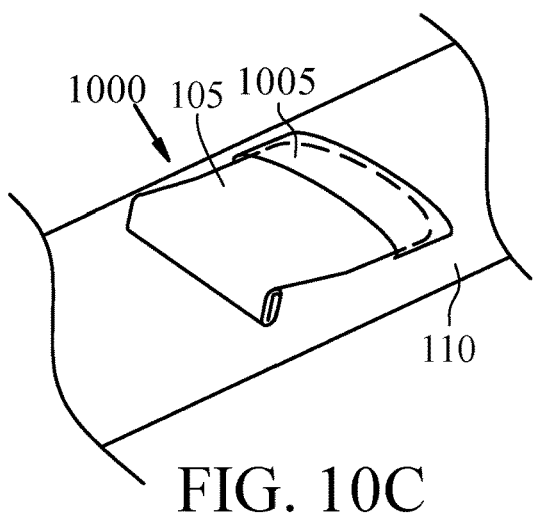
Figure 10D:
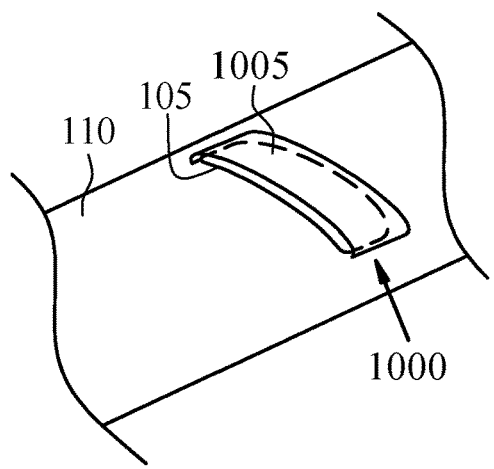
Figure 10E:
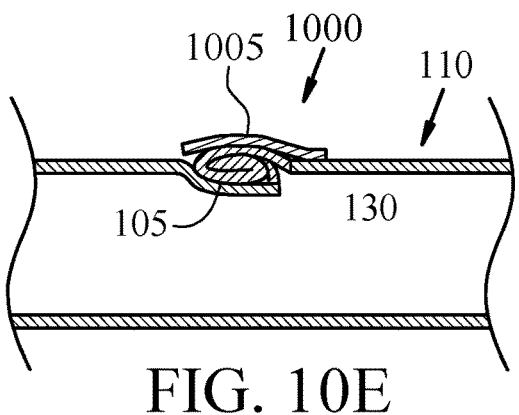
Figure 10F:
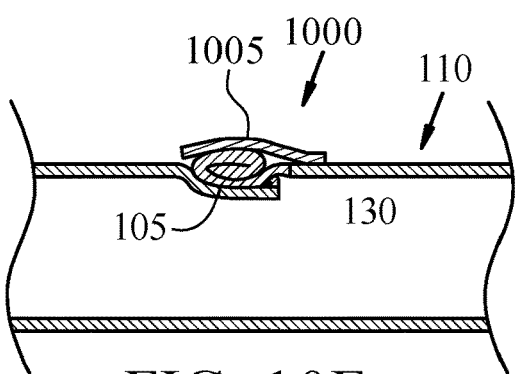

FIG. 10A-10B show valve arrangement 1000 in an open position. To close valve arrangement 1000 a user can start rolling outside edge 125 in a downwards roll as show in FIG. 10C towards inside edge 130. Valve arrangement 1000 can also be rolled closed with an upwards roll until rolled underneath cover element 1005 as seen in FIG. 10F. Since cover element 1005 provides a surface for rolled chute 105 to bind against chute 105 only need to be rolled under cover element 1005 to be in the closed configuration. Once chute 105 is rolled inside the pocket created by cover element 1005 and in the closed configuration as show in FIG. 10D or FIG. 10F, valve arrangement 1000 will be in the closed self-locking configuration. FIG. 10E and FIG. 10F show sectional views of chute 105 in the closed position under cover element 1005 in a downwards and upwards roll respectively. Cover element 1005 offers protection to rolled chute 105 in the closed position and may assist in maintaining a closed position by preventing rolled edge 135 from lifting away from the surface of inflatable object 110, reducing the central angle needed to allow the valve embodiment to be self-locking. In some embodiments attachment elements may be attached to front edge 1010 and the adjacent location on the surface of inflatable object 110 to close the pocket created by cover element 1005.

Figure 11A:
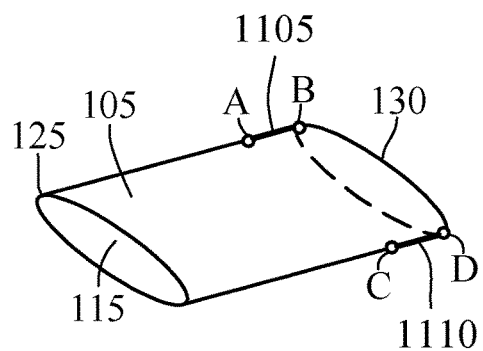
FIG. 11A-11D
illustrate views of a valve embodiment with an alternative method to produce a pocket cover.
Figure 11B:
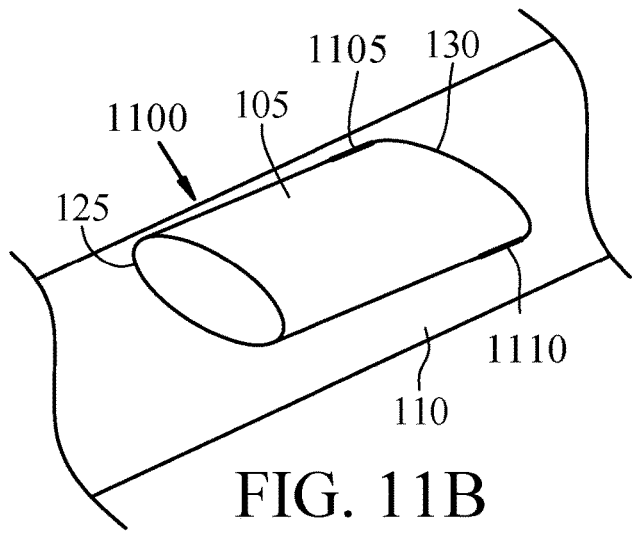
Figure 11C:
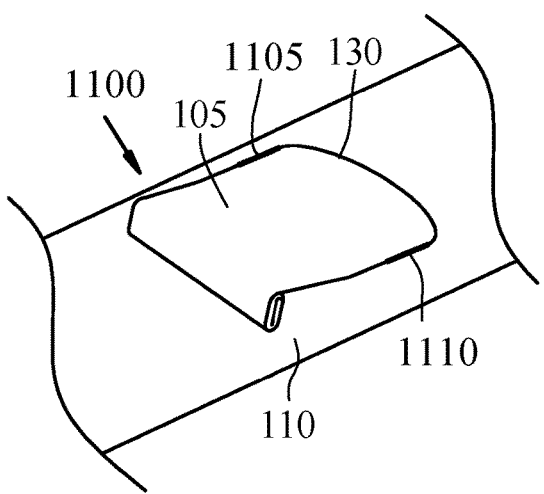
Figure 11D:
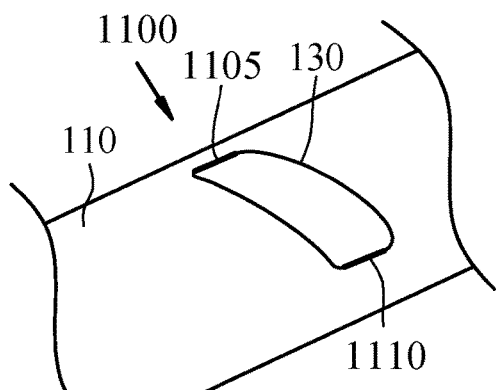

In some embodiments sections of chute 105 can be connection to inflatable object 110 to reproduce the pocket created by cover element 1005 in valve arrangement 1000. FIG. 11A shows chute 105 with points A, B, C, and D. Points B and D are located on opposite sides of chute 105 along inside edge 130. Point A and C are location a distance away from points B and D respectively towards outside opening 115. The distance being a similar length of side edge 1020 and side edge 1025. The sections from point A to B and from C to D respectively define edge section 1105 and edge section 1110. FIG. 11B shows valve arrangement 1100 with chute 105 connected to inflatable object 110 along inside edge 130, edge section 1105, and edge section 1110. The connections may be made with any technique known to the art such as thermal bonding, glue, stiches, tape, etc. Valve arrangement 1100 can be closed in a similar fashion to valve arrangement 1000. FIG. 11C shows chute 105 being rolled in a downwards roll into a closed position tucked under the pocket created by the connections at edge section 1105 and edge section 1110 shown in FIG. 11D.

Figure 12:
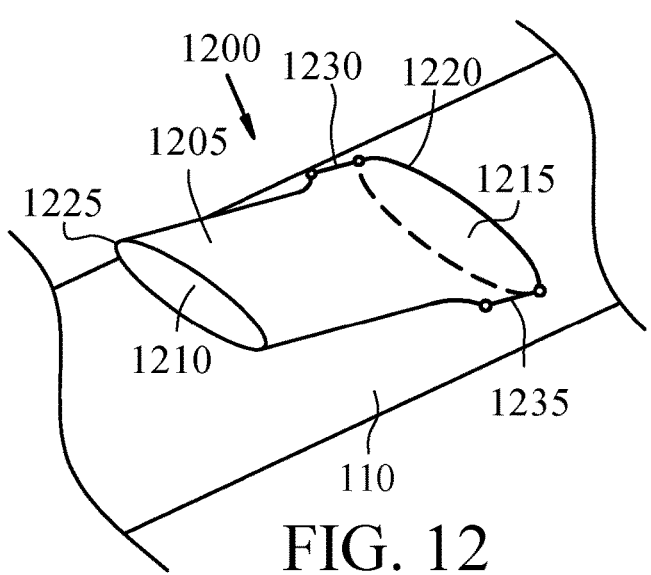
FIG. 12
illustrates a view of a valve embodiment with an alternative method to produce a pocket cover with a tapered base.

Some valve embodiments similar to valve arrangement 1100 can have a tapered chute that is wider at the base where it connects to an inflatable object as seen in valve arrangement 1200 (FIG. 12). In valve arrangement 1200, tapered chute 1205 connects to inflatable object 110 along inside edge 1220, edge section 1230 and edge section 1235 in a similar fashion that valve arrangement 1100 connects along inside edge 130, side edge 1020 and side edge 1025 respectively. Valve arrangement 1200 can be used to inflate inflatable object 110 through outside opening 1210 and inside opening 1215 in a similar fashion as previously discussed embodiment. Valve arrangement 1200 can be rolled into a closed configuration started from outside edge 1225 and rolling in a downwards roll and tucked under the pocket created by connections along inside edge 1220, edge section 1230 and edge section 1235. The wider base of tapered chute 1205 creates a larger pocket which may make it easier for the user to tuck rolled tapered chute 1205 into the closed configuration.

Figure 13A:
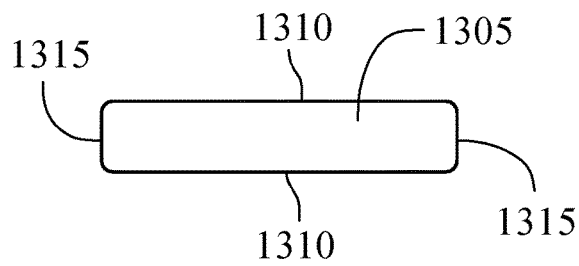
FIG. 13A-13C
illustrate valve embodiments with resilient members.

Some valve embodiments may include one or more resilient members. FIG. 13A shows resilient member 1305 with long edges 1310 and side edges 1315. Resilient member 1305 can be made from a thin flexible material such as a plastic, composite, card stock, ect. Long edges 1310 may be straight and parallel (FIG. 13A).

Figure 13B:
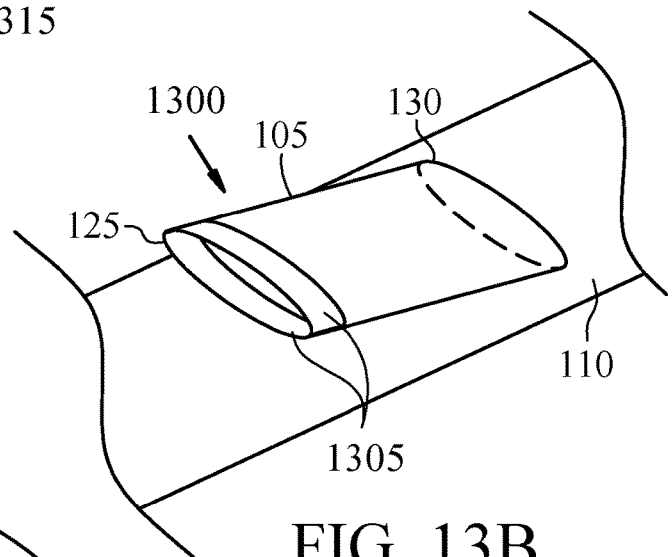
Figure 13C:
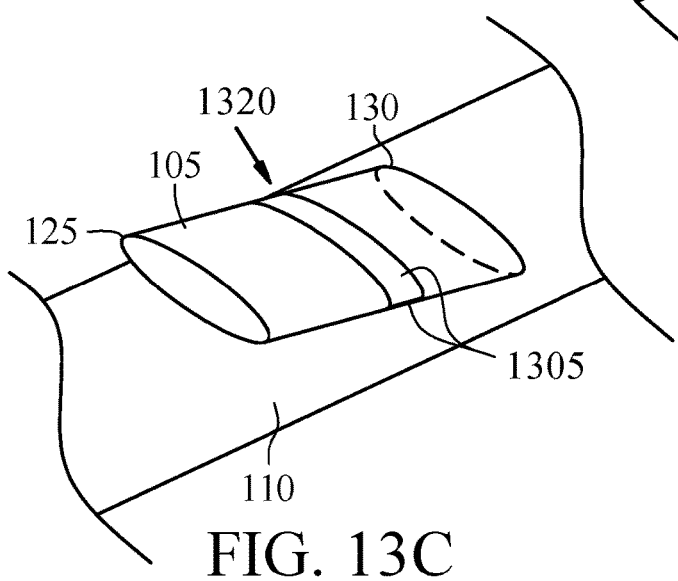

FIG. 13B shows valve arrangement 1300, which is similar to valve arrangement 100, but with the addition of with two resilient members 1305 on opposite sides of outside edge 125. The two resilient members 1305 may be connected by any technique known to the art on the inside or outside of chute 105. Resilient members 1305 may be directly along outside edge 125, as seen in valve arrangement 1300 (FIG. 13B), but may also be located closer to inside edge 130, as seen in valve arrangement 1320 (FIG. 13C). Resilient members 1305 can assist the user in rolling chute 105 into a closed position, opening and closing outside opening 115, and increase rigidity of rolled chute 105 in the closed position. Valve arrangement 1300 may be rolled into a closed position similar to other embodiments. In the closed position resilient members 1305 will lay flat relative to the surface of inflatable object 110. Resilient members 1305 should be positioned to allow chute 105 to be rolled tight against inside edge 130. Resilient members 1305 should not prevent rolled chute 105 from forming an arc shape in the closed position. Expressed differently, the resilient members lie flush and parallel with the curved surface of the inflatable object in the closed position.

Figure 14:
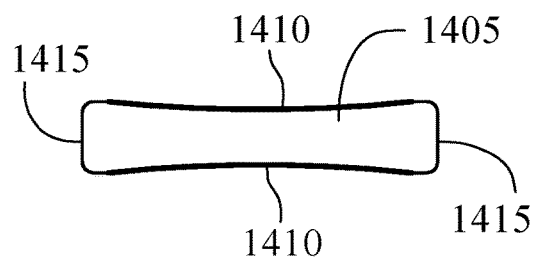
FIG. 14
illustrates a view of a resilient member with long curved edges

In some embodiments, a resilient member may have long edges that are not straight. Long edges that are not straight could be used to alter how tight sections of chute 105 are rolled around a resilient member. An embodiment of a resilient member is show in FIG. 14, where resilient member 1405 includes long curved edges 1410 and side edges 1415. Resilient member 1405 can be made from a thin flexible material such as a plastic, composite, card stock, ect. Long curved edges 1410 create a narrow section along the middle of resilient member 1405. When chute 105 is rolled around resilient member 1405 the sections of chute 105 will be tightly rolled near side edges 1415 and looser near the middle of resilient member 1405.

In some embodiments a resilient member may have a curved shape permanently added to assist creating an arc shape of a chute in the closed position.

In some embodiments a single resilient member may be used on one side of outside edge 125. Further, other embodiments do not require resilient member 1305 to be attached at all, but rather held in place by the user to assist the rolling of chute 105. In some embodiments resilient member 1305 can sit in a pocket that is connected to chute 105.

Some valve embodiments may include an element that allows fluid to flow freely through an embodiment in one direction and restricts fluid flow in the opposite direction. These valve embodiments would act as a one-way valve. A one-way valve embodiment may be oriented to allow fluid to flow into the inflatable object and fluid will be restricted from leaving inflatable object 110. These embodiments reduce fluid lost during the inflation process and add redundancy to the closed position.

Valve arrangement 1500 is similar to valve arrangement 1000, but with the addition of one-way valve 1505. FIG. 15A shows one-way valve 1505 as a flexible tube with outside edge 1510, inside edge 1515, side edge 1520, and side edge 1525. Side edge 1520 and side edge 1525 span the distance from point E to F and point G to H respectively. One-way valve 1505 may be made of a flexible sheet material similar to inflatable object 110, chute 105 or any flexible sheet material known in the art.

FIG. 15B shows valve arrangement 1500 with one-way valve 1505 connected to chute 105. One-way valve 1505 is located inside of chute 105 and oriented with outside edge 1510 closer to outside opening 115 and inside edge 1515 closer to inside opening 120. The full length of outside edge 1510 is attached to the inside surface of chute 105 on a parallel plane to outside opening 115 so that all fluid that passes through chute 105 must also pass through one-way valve 1505. The full lengths, portions of, or a section close to inside edge 1515 of side edge 1520 and side edge 1525 are attached on relatively opposing sides of the inside surface of chute 105 along a perpendicular plane to outside opening 115. All connections can be made with any method known in the art. Inside edge 1515 is not connected and is allowed to move freely.

FIG. 15C-15D show sectional views of valve arrangement 1500 with chute 105 connected to inflatable object 110 in a similar fashion as previously described embodiments. When the fluid pressure at outside opening 115 is adequately greater than the fluid pressure at inside opening 120 then one-way valve 1505 will move into an open position (FIG. 15C). At this point fluid will flow through chute 105 into inflatable object 110. When the fluid pressure at inside opening 120 is greater than at outside opening 115, fluid will start to flow towards outside opening 115 and one-way valve 1505 will collapse into a closed position (FIG. 15D) and fluid will be restricted from leaving inflatable object 110 through chute 105.

Figure 15E:
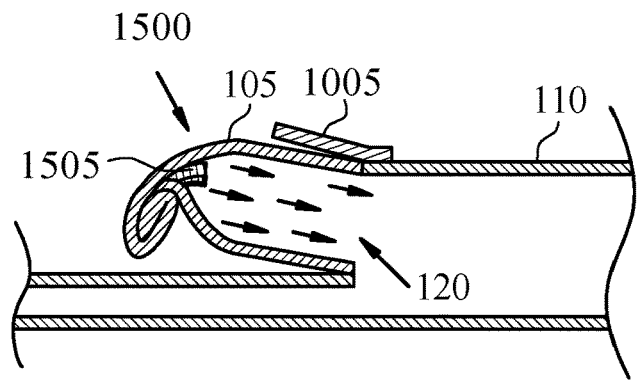

To inflate inflatable object 110 through valve arrangement 1500 a stream of fluid can be projected towards outside opening 115. If the stream of fluid originates at a distance away from outside opening 115 at the same time the area surrounding outside opening 115 is left unobstructed, then the stream of fluid will create a low pressure zone at outside opening 115 that will pull surround fluid into outside opening 115 amplifying inflation. Once the desired amount of fluid is inside inflatable object 110 then chute 105 can be rolled into a closed position in a similar fashion to previously discussed embodiments. When chute 105 is rolled in a closed position at least a portion of the remaining fluid inside chute 105 can be forced into inflatable object 110 to increase final pressure (FIG. 15E).

Figure 15F:
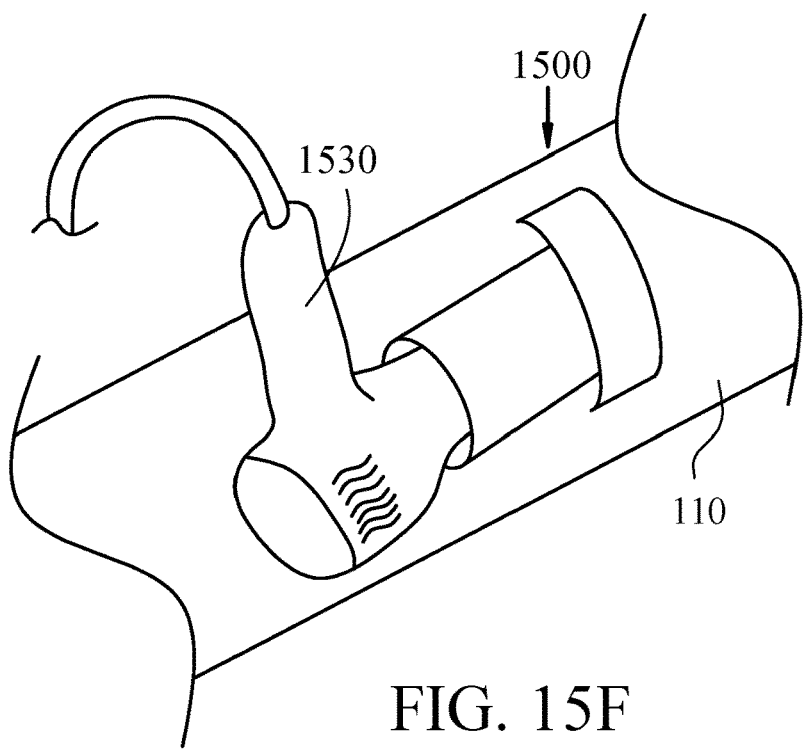
Figure 15G:
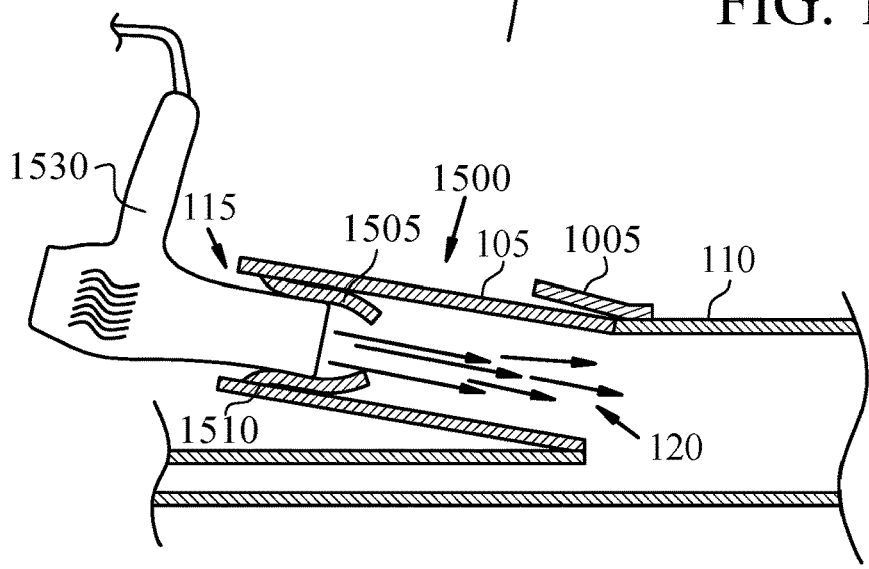

Another way to inflate inflatable object 110 through valve arrangement 1500 is with standard hair dryer 1530. Some valve embodiments have an outside opening 115 that is an adequate size to allow the nozzle of a standard hair dryer to be inserted into the valve embodiments. FIG. 15F and FIG. 15G show valve arrangement 1500 being inflated by standard hair dryer 1530. The position of one-way valve 1505 is such that when standard hair dryer 1530 is turned on, inflatable object 110 will rapidly inflate and one-way valve 1505 will create a seal around the outside nozzle of standard hair dryer 1530 and fluid will be restricted from leaving inflatable object 110.

Figure 15H:
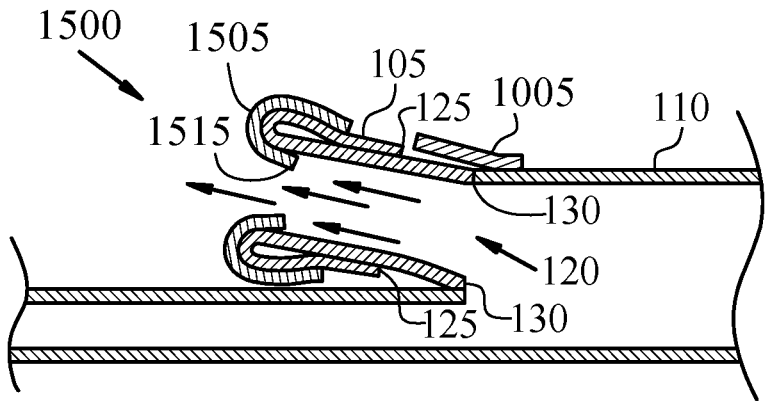
Figure 15I:
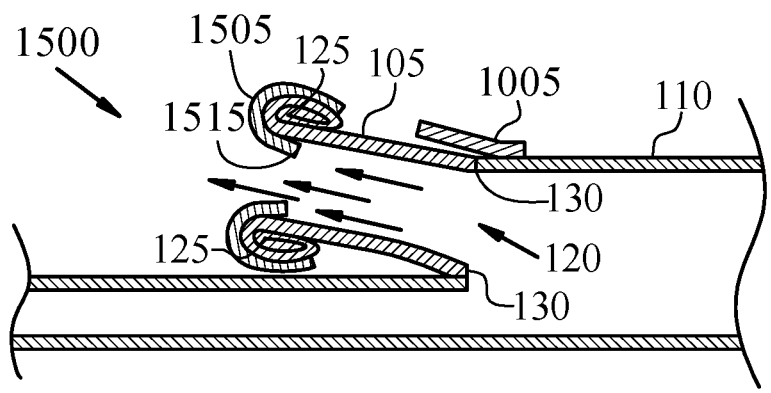
Figure 15J:
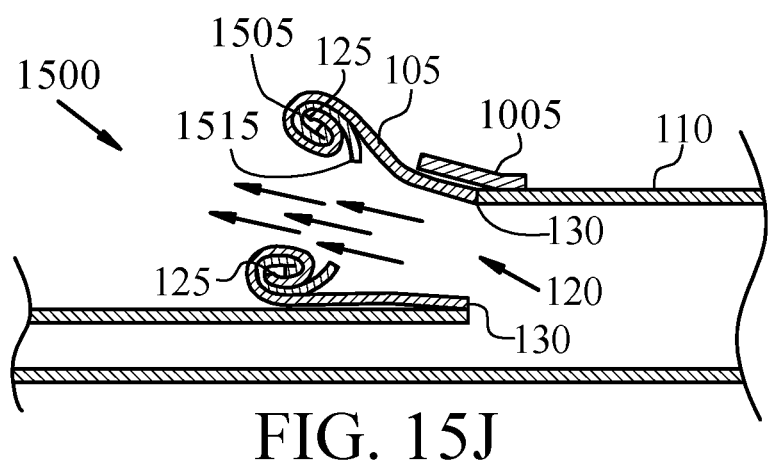

FIG. 15H-15J show sectional views of three possible inverted positions for valve arrangement 1500. FIG. 15H shows chute 105 inverted far enough that one-way valve 1505 no longer restricts the flow of fluid exiting inflatable object 110. This position will be referred to as the straight inverted position. The straight inverted position is achieved by pulling outside edge 125 overtop of chute 105 resulting in one-way valve 1505 being on the outside of chute 105

FIG. 15I shows chute 105 and one-way valve 1505 rolled together outwards into a torus shape to invert chute 105 and allow fluid to exit inflatable object 110. This position will be referred to as an outward rolled inverted position. To convert valve arrangement 1500 into an outward rolled inverted position a user could start at outside edge 125 then continue rolling outwards until valve arrangement 1500 no longer restricts the flow of fluid through chute 105. The rolled inverted position is especially useful for valve embodiments where inside edge 1515 is too close to inside opening 120 to achieve a straight inverted configuration.

It is also possible to roll chute 105 inwards into a torus shape to achieve a similar results to an outward rolled inverted position. Shown in FIG. 15J this position will be referred to as an inward rolled inverted position. Any of these inverted positions allow inflatable object 110 to be rapidly deflated. Inverted positions also allow items besides fluid to exit inflatable object 110, and allow all the benefits of having an unrestricted opening.

Another deflation method involves a user reaching through outside opening 115 and manually opening one-way valve 1505 with one or two hands or other objects. Using this method may allow some embodiments to have a shorter chute length.

Figure 16A:
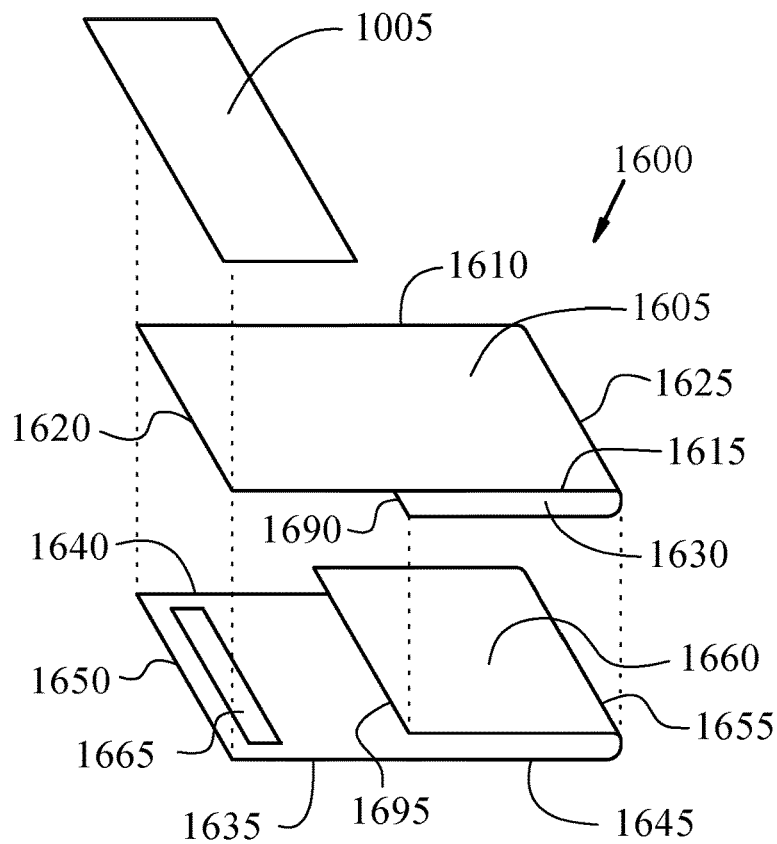
FIG. 16A-16C
illustrate views of a valve embodiments with a one-way valve created from chute sheets.

Some embodiments similar to valve arrangement 1500 can create a chute and one-way valve similar to chute 105 and one-way valve 1505 where a portion of the chute and one-way valve are made from the same sheet of material. FIG. 16A shows an assembly view of valve arrangement 1600. Valve arrangement 1600 is created from upper sheet 1605, lower sheet 1635 and cover element 1005. Upper sheet 1605 and lower sheet 1635 can be sheets made from similar materials as previously described embodiments. Upper sheet 1605 and lower sheet 1635 are long enough to each create one side of the valve chute then fold over to create one side of the one-way valve. One way to create valve arrangement 1600 is with the following steps. Cutout 1665 is provided in lower sheet 1635 near unfolded end 1650 thereof in order to form the inside opening of valve arrangement 1600, which is achieved by connecting the edges around cutout 1665 to edges of a similar opening in a curved section of inflatable object 110. Then a portion of upper sheet 1605 and lower sheet 1635 are folded partially over themselves to create folded-over end 1625 and folded-over end 1655 respectively. This creates inwardly folded flap 1630 and inwardly folded flap 1660 which reach over a remainder of upper sheet 1605 and lower sheet 1635 respectively. At unfolded ends of upper sheet 1605 and lower sheet 1635 situated opposite folded-over end 1625 and folded-over end 1655 thereof, upper sheet 1605 terminates in a unfolded end 1620, and lower sheet 1635 terminates in a unfolded end 1650. Side edges 1610 and 1615 of upper sheet 1605 span from unfolded end 1620 past folded-over end 1625 and continue to flap end 1690 thereof. Likewise, side edges 1640 and 1645 of lower sheet 1635 span from unfolded end 1650 past folded-over end 1655 and continue to flap end 1695 thereof. Folded-over end 1625 and folded-over end 1655 should be at a position along upper sheet 1605 and lower sheet 1635 so that inwardly folded flap 1630 and inwardly folded flap 1660 have a length sufficiently long enough to create a one-way valve (FIG. 16A). Then place upper sheet 1605 and lower sheet 1635 face-to-face with inwardly folded flap 1630 and inwardly folded flap 1660 between them and connect the entire length of side edge 1610 to side edge 1640 and side edge 1615 to side edge 1645. Any sections where the side edges overlap will also be connected to themselves. Then connect unfolded end 1620 to unfolded end 1650. In some embodiment this connection may also connect to inflatable object 110 for ease of manufacturing or to improve fluid flow through cutout 1665. Then cover element 1005 can be connected to inflatable object 110 in a similar fashion as previously described embodiments. All connections can be made with any technique known to the art such as thermal bonding, glue, stiches, tape, etc.

Figure 16B:
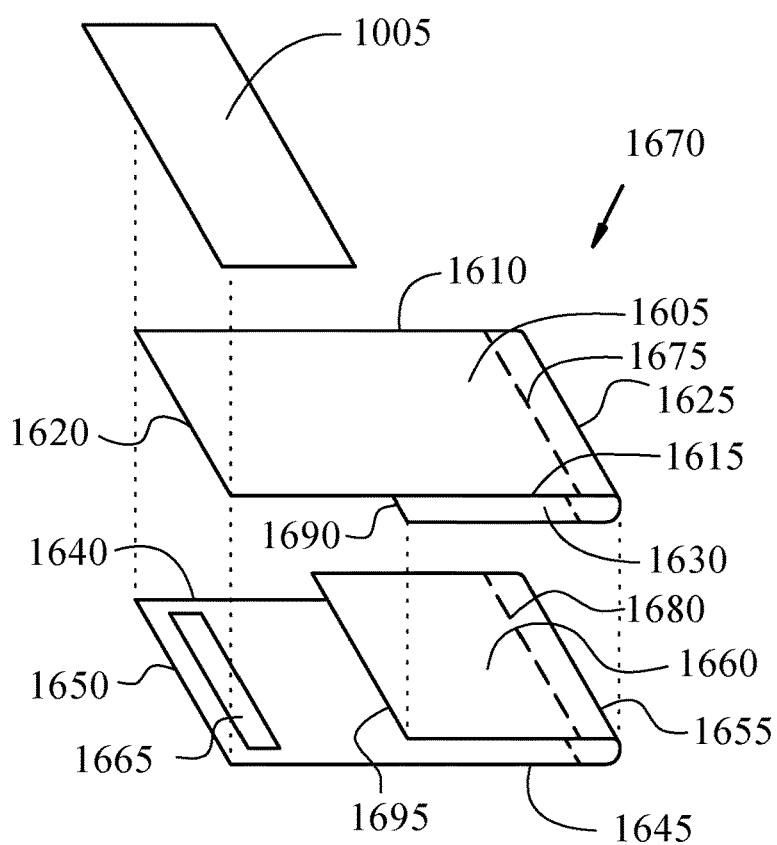
Figure 16C:
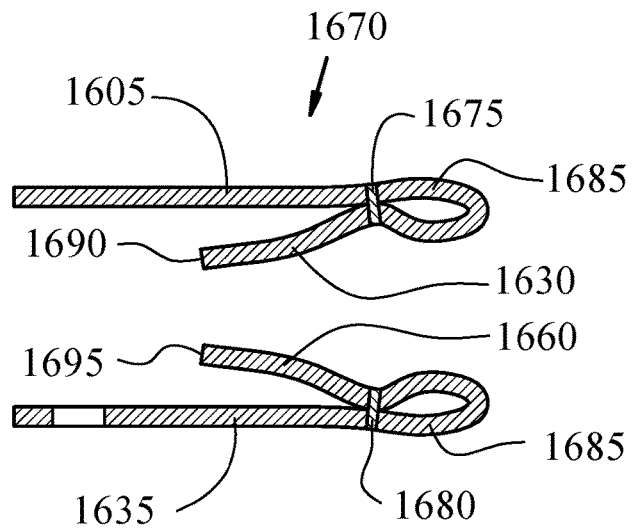

FIG. 16B and FIG. 16C show an assembly and cross sectional view of valve arrangement 1670 which is similar to valve arrangement 1600 with the addition of connection 1675 and connection 1680 to create a type of resilient member. Both connection 1675 and connection 1680 are parallel to folded-over end 1625 and folded-over end 1655 respectively. Both connection 1675 and connection 1680 are a sufficient distance away from folded-over end 1625 and folded-over end 1655 to each create a resilient member 1685 (FIG. 16C), each resilient member 1685 having the form of a folded-over lip that impart an added stiffness at the outside edge of valve arrangement 1670 for the same purposes contemplated above for resilient members 1305. Connection 1675 and connection 1680 can be made with any technique known to the art such as thermal bonding, glue, stiches, tape, etc. Connection 1675 and connection 1680 can also maintain position of folded-over end 1625 and folded-over end 1655 to ease alignment of upper sheet 1605 and lower sheet 1635 before connecting side edge 1610 to side edge 1640 and side edge 1615 to side edge 1645.

Figure 17:
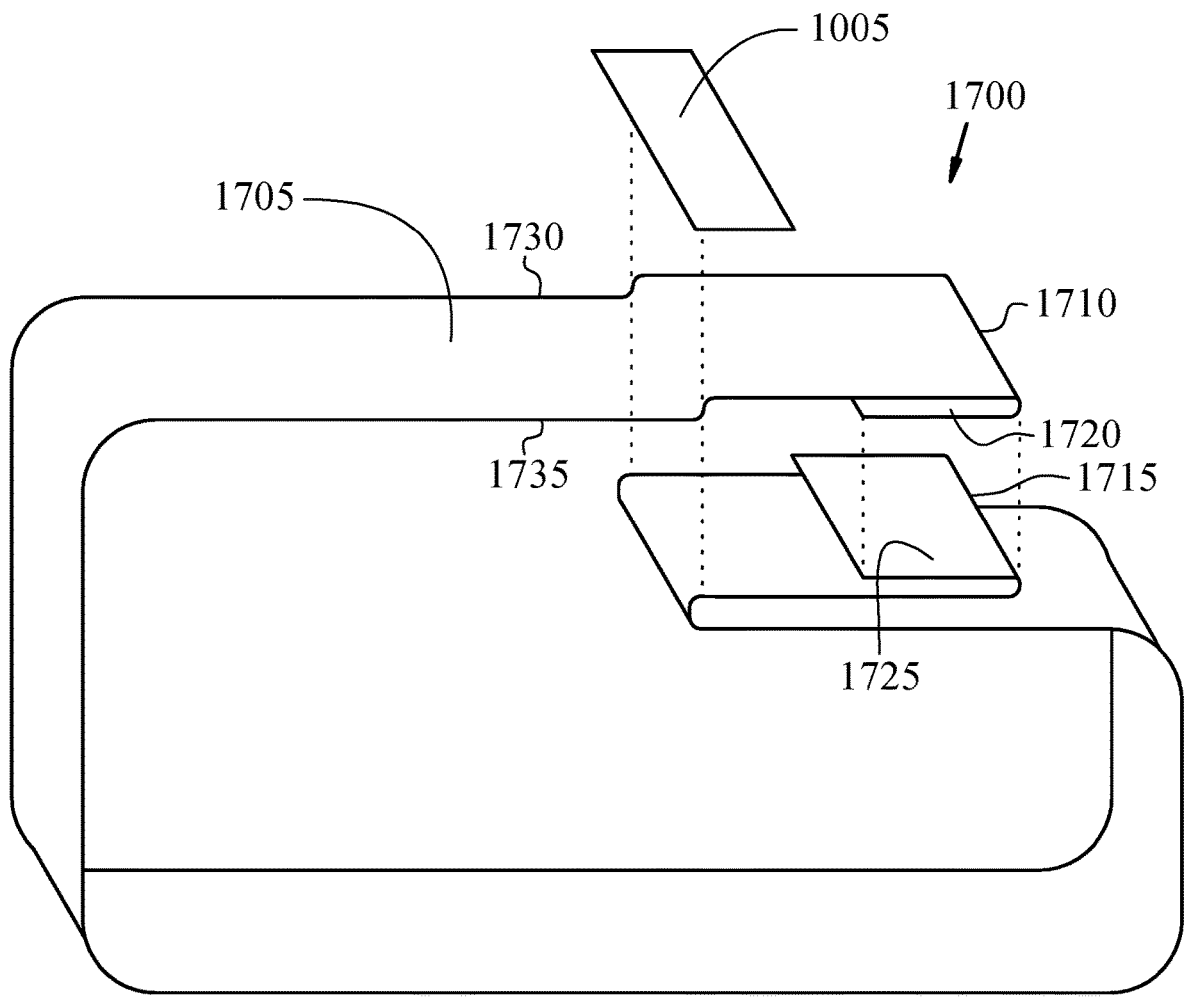
FIG. 17
illustrates an assembly view of a valve embodiments with a flexible chute and one-way valve created from a perimeter sheets.
Figure 30:
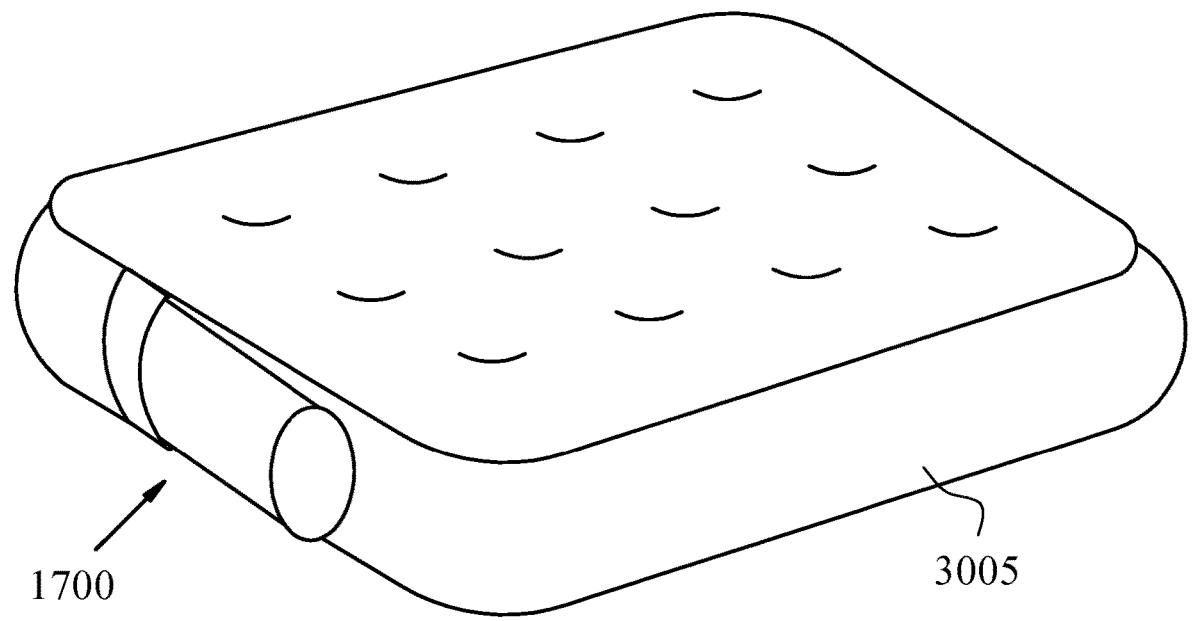
FIG. 30
illustrates a valve embodiment designed to an air mattress.

FIG. 17 shows an assembly view of valve arrangement 1700 which is similar to valve arrangement 1600 except that upper sheet 1605 and lower sheet 1635 are made from one continuous sheet, elongated singular sheet 1705, eliminating unfolded end 1620, unfolded end 1650 and cutout 1665. These embodiments can be useful for inflatable objects such as air mattress 3005 in FIG. 30. So instead of two sheets each having a folded-over end and an opposing unfolded end, elongated singular sheet 1705 has folded-over end 1710 and folded-over end 1715 defining respective inwardly folded flap 1720 and inwardly folded flap 1725 that form respective halves of the one-way valve in the final assembled state thereof. Instead of connecting side edge 1730 and side edge 1735 to themselves over the full length of elongated singular sheet 1705 from one end thereof to the other, side edge 1730 and side edge 1735 are connected to themselves only over a partial length of elongated singular sheet 1705 from the folded-over ends thereof to a location past inwardly folded flap 1720 and inwardly folded flap 1725. This interconnected portion of elongated singular sheet 1705 defines the flexible chute of the finished valve, and a remainder portion of elongated singular sheet 1705 is used to define a perimeter of an inflatable object, for example as shown in FIG. 30 where this remainder of the sheet defines a perimeter edge of air mattress 3005.

As an alternative to manufacturer incorporation of elongated singular sheet 1705 as an integral part of the inflatable object, the remainder portion of elongated singular sheet 1705 may be wrapped around the perimeter of an existing inflatable object, and connected thereto along the side edges of elongated singular sheet 1705. In such embodiments, elongated singular sheet 1705 would be connected to the existing perimeter of inflatable object 110 in an appropriately placed position thereon ensuring that the created chute aligns over the opening in the inflatable object 110.

Some embodiments may include an element inside chute 105 to assist with converting chute 105 into an inverted position. FIG. 18A-18E show valve arrangement 1800 which is similar to valve arrangement 1500 but with the addition of handle 1805. In valve arrangement 1800, handle 1805 is made from a flexible sheet material having long edge 1810, long edge 1815, side edge 1820 and side edge 1825. Handle 1805 may be made from a similar to inflatable object 110, chute 105 or any flexible sheet material known in the art.

Figure 18A:
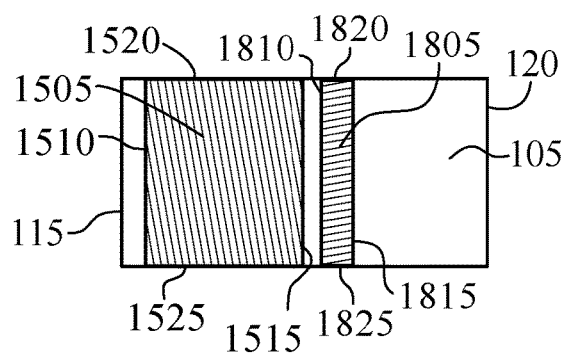
FIG. 18A-18E
illustrate views of a valve embodiment with a one-way valve with deflation handle.

FIG. 18A shows handle 1805 located inside of chute 105 and oriented a distance away from inside edge 1515 towards inside opening 120. Long edge 1810 is closer and parallel to outside opening 115 and long edge 1815 closer to inside opening 120. Side edge 1820 and side edge 1825 are connected to the inside of chute 105 on relatively opposing sides and aligned with side edge 1520 and side edge 1525 respectively. Both connections can be made with any method known in the art. Long edge 1810 and long edge 1815 are allowed to move freely.

Figure 18B:
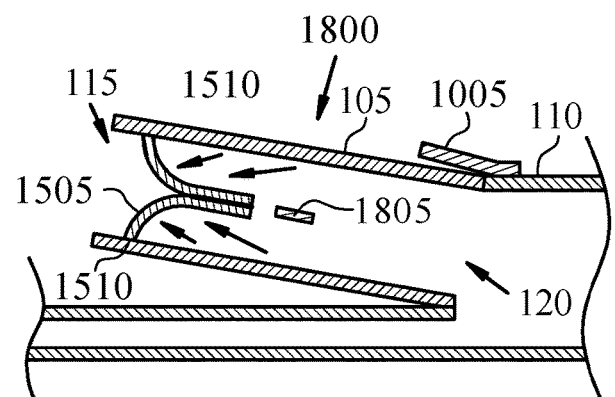
Figure 18C:
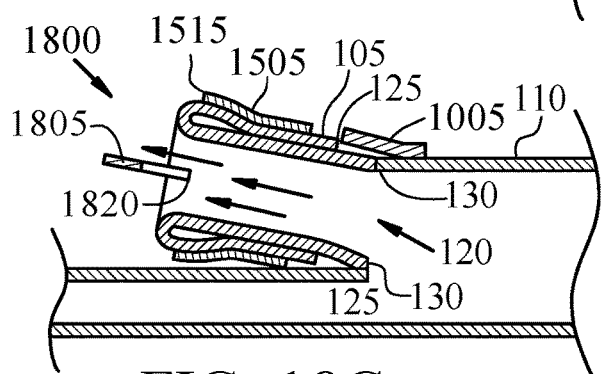
Figure 18D:
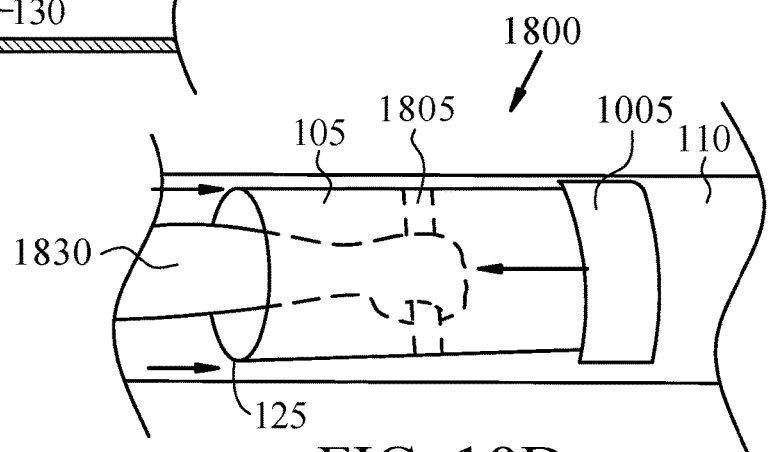
Figure 18E:
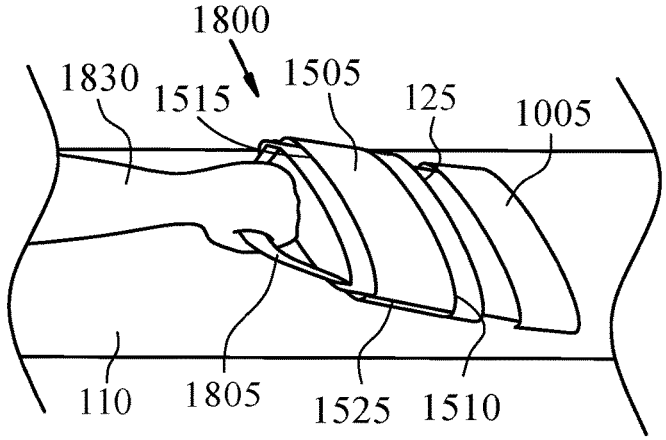

FIG. 18B shows a sectional view of valve arrangement 1800 inflated with one-way valve 1505 in a closed position so that fluid will be restricted from leaving inflatable object 110. FIG. 18C shows a sectional view of valve arrangement 1800 in a straight inverted position. To convert valve arrangement 1800 into a straight inverted position user's arm 1830 may reach through outside opening 115 to grab handle 1805 (FIG. 18D) and then push outside edge 125 down user's arm 1830 towards inside edge 130 (FIG. 18E).

Valve arrangement 1800 is one possible embodiment that includes an element to assist converting the valve into an inverted position. Other embodiments may include alternative elements such as a tab, or tabs, a handle with few or more connection points, etc.

In some valve embodiments the chute may be tapered so that the outside opening is wider than the rest of the chute. A wider opening can assist the user while converting the chute into an inverted position. Other embodiments may have sections of the chute, or the entire chute, made from an elastic material to assist with the inversion process.

Figure 19A:
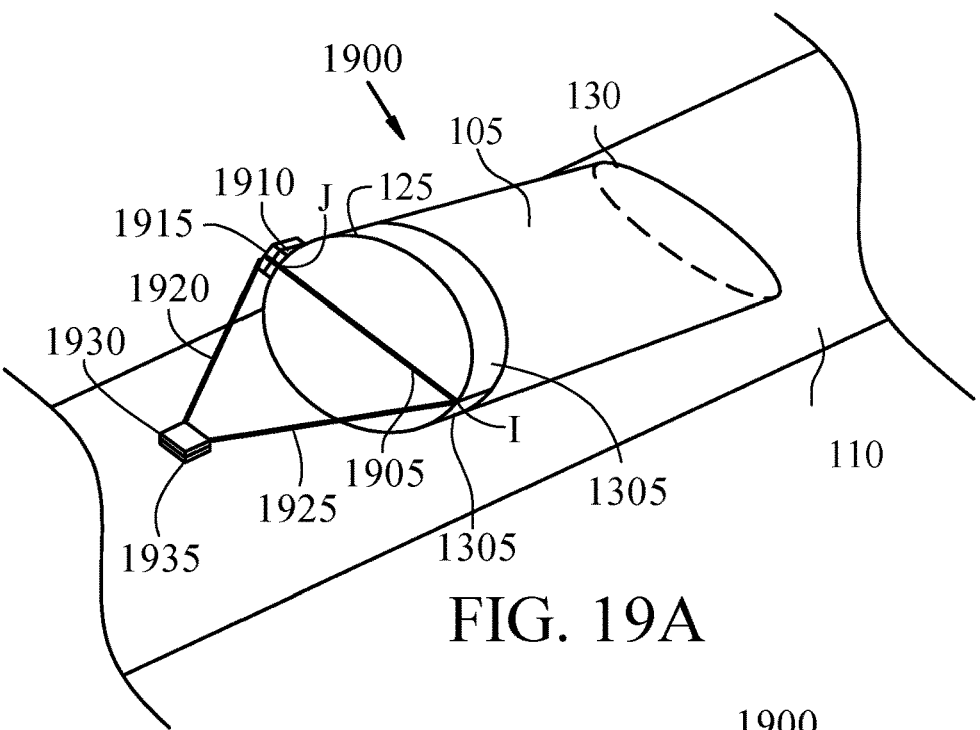
FIG. 19A-19C
illustrate views of a valve embodiment with chute supports allowing a self-supporting open position.
Figure 19B:
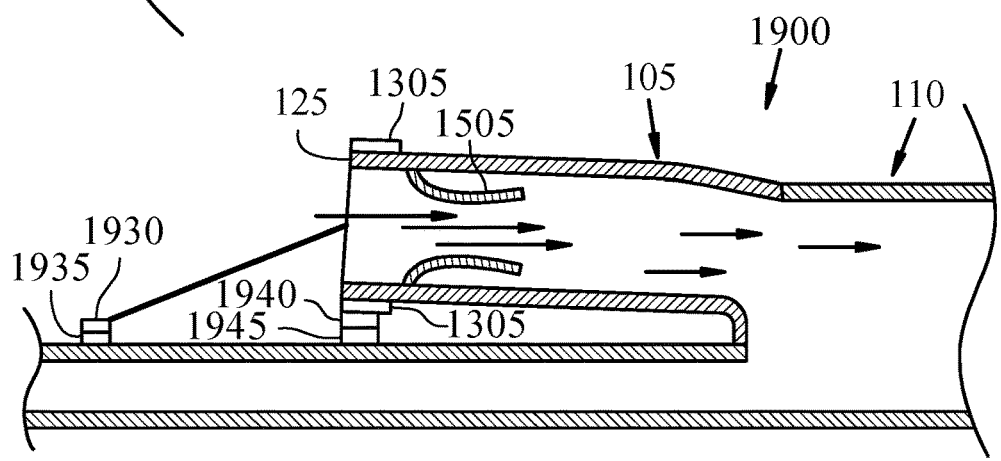

Some valve embodiments can be held in an open position, without the assistance of the user. FIG. 19A-19B respectively show a perspective and sectional view of valve arrangement 1900 being held in an open position, known as the passive intake position. Valve arrangement 1900 has the following elements connected in similar fashions to previously described embodiments; chute 105 is connected to inflatable object 110 along inside edge 130, two resilient members 1305 are connected to opposite sides of outside edge 125, and one-way valve 1505 connects to the inside of chute 105. Once in a passive intake position, inflatable object 110 can be inflated by simply directing fluid towards outside opening 115. A fluid flow can be from various sources such as, user's breath, moment of user's hand, manual pump, hair dryer, fan, air tank, bellows, wind, fluid current, etc.

FIG. 19A shows points I and J located on opposite sides of outside edge 125 where side edges 1315 from each resilient members 1305 meet respectively. One end of cross support 1905 is connected to chute 105 at point I, while the other end of cross support 1905 is connected to attachment element 1915. Attachment element 1910 is connected to chute 105 at point J. Attachment element 1910 is shown non-permanently attached to attachment element 1915. Support member 1920 has one end connected to attachment element 1915 while the other end is connected to attachment element 1930. Support member 1925 also has one end connected to attachment element 1930 while the other end is connected to point I on chute 105. Cross support 1905, support member 1920 and support member 1925 may be made from a flexible line or ribbon. Attachment element 1935 is connected to the surface of inflatable object 110 in a location that aligns with attachment element 1930 when support members 1920 and 1925 are in an elongated position with no slack. In some embodiments cross support 1905, support member 1920 and support member 1925 can be a continuous element attached to point I, attachment element 1915, and attachment element 1930 at the appropriate distances.

FIG. 19B shows attachment element 1940 permanently connect to lower resilient member 1305. Attachment element 1945 is connected to the surface of inflatable object 110 in a location that intercepts where attachment element 1940 is located when chute 105 is in the open position. Attachment elements 1940, 1945, 1910, 1915, 1930, and 1935 can be any type of attachment elements known in the art and may include hook and loop, snaps, buttons, buckles, magnets, zipper, etc.

Figure 19C:
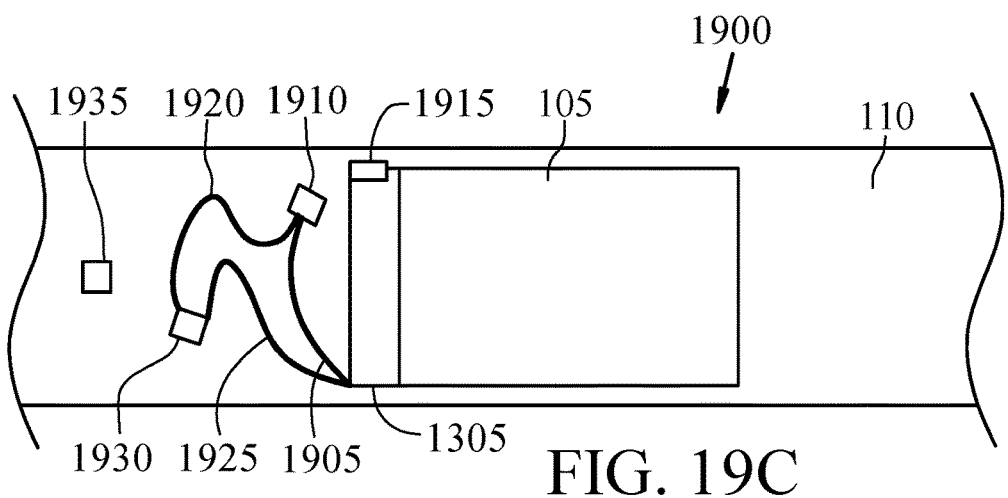

To set valve arrangement 1900 in the passive intake position (FIG. 19A-19B) chute 105 is unroll from a closed position, in a similar fashion to other embodiments), to expose cross support 1905, support member 1920, and support member 1925, which were rolled up in chute 105 (FIG. 19C). At this point attachment elements 1910, 1930, and 1940 may be respectively connected to attachment element 1915, 1935, and 1945. The reverse process can be used to close valve arrangement 1900.

Cross support 1905 is shorter in length then long edge 1310 of resilient member 1305.

Therefore, when attachment elements 1910 and 1915 are connected resilient members 1305 are forces into opposing arc shapes holding outside edge 125 in an open position. The length of support members 1920 and 1925, and the position of attachment element 1935, determine the orientation of outside opening 115 relative to inflatable object 110.

In some embodiments cross support 1905 maybe adjustable to change the amount outside opening 115 is held open. Likewise, support members 1920 and 1925 may be adjustable to change the orientation of outside opening 115 relative to inflatable object 110. This may also be accomplished with multiple mounting attachment elements. The change in orientation and the amount outside opening 115 is held open will contribute to the amount of fluid that is directed into inflatable object 110.

Figure 20A:
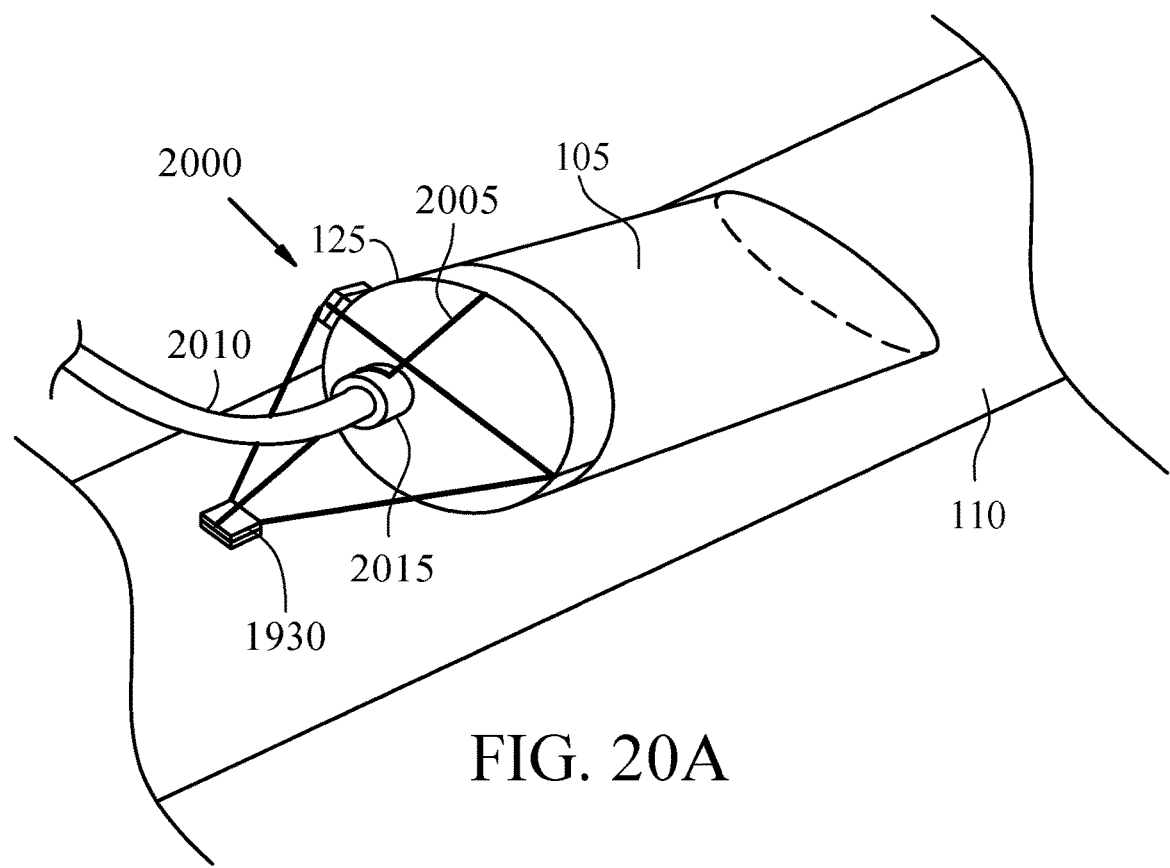
FIG. 20A-20B
illustrate views of a valve embodiment with chute supports allowing passive and direct inflation with an fluid source.
Figure 20B:
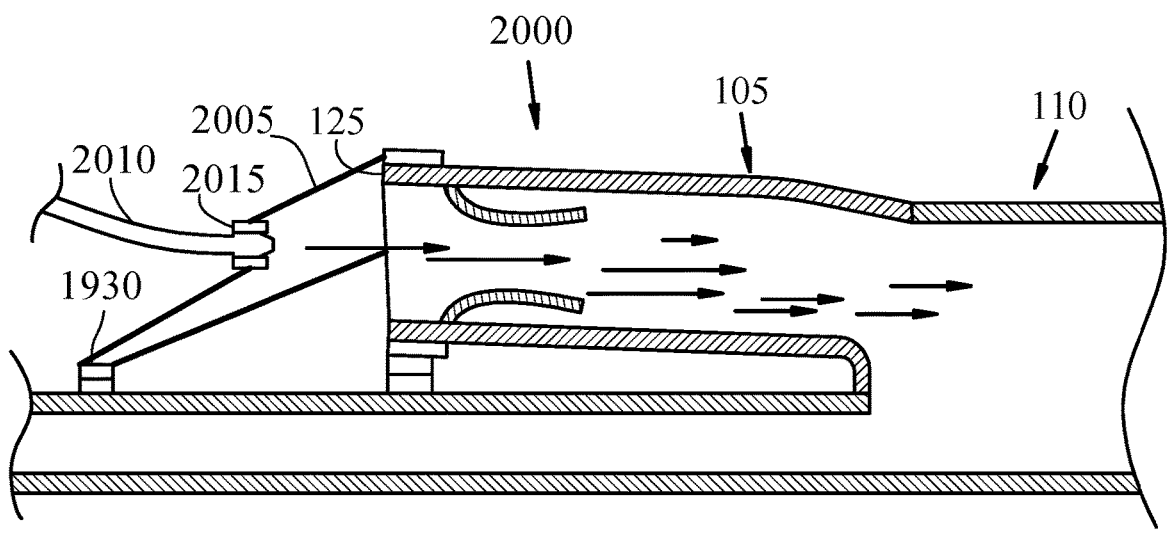

Some valve embodiments can be held in a passive intake position while holding and directing a source of fluid for inflation. FIG. 20A-20B show valve arrangement 2000, which is similar to valve arrangement 1900, but with the additions of support member 2005, fluid source 2010 and holding fixture 2015. Fluid source 2010 may be produced by various sources such as, manual pump, hair dryer, fan, air tank, bellows, etc. FIG. 20A-20B show how support member 2005 may be connected to the top middle of outside edge 125 on one end and to attachment element 1930 at the other end. Support member 2005 may be made of a similar material as support member 1920. To hold fluid source 2010 in a useful location and orientation, holding fixture 2015 may adjusted to sit anywhere along the length of support member 2005. Holding fixture 2015 may be any type of attachment element known in the art.

In some embodiments holding fixture 2015 may connect directly to attachment element 1930 or the nearby surface on inflatable object 110. In these embodiments support member 2005 would not be required.

Figure 21A:
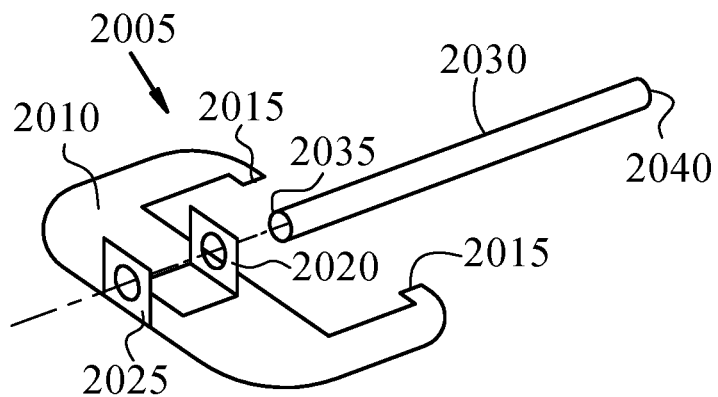
FIG. 21A-21D
illustrate views of a valve embodiment with an adaptor and inflation tube.
Figure 21B:
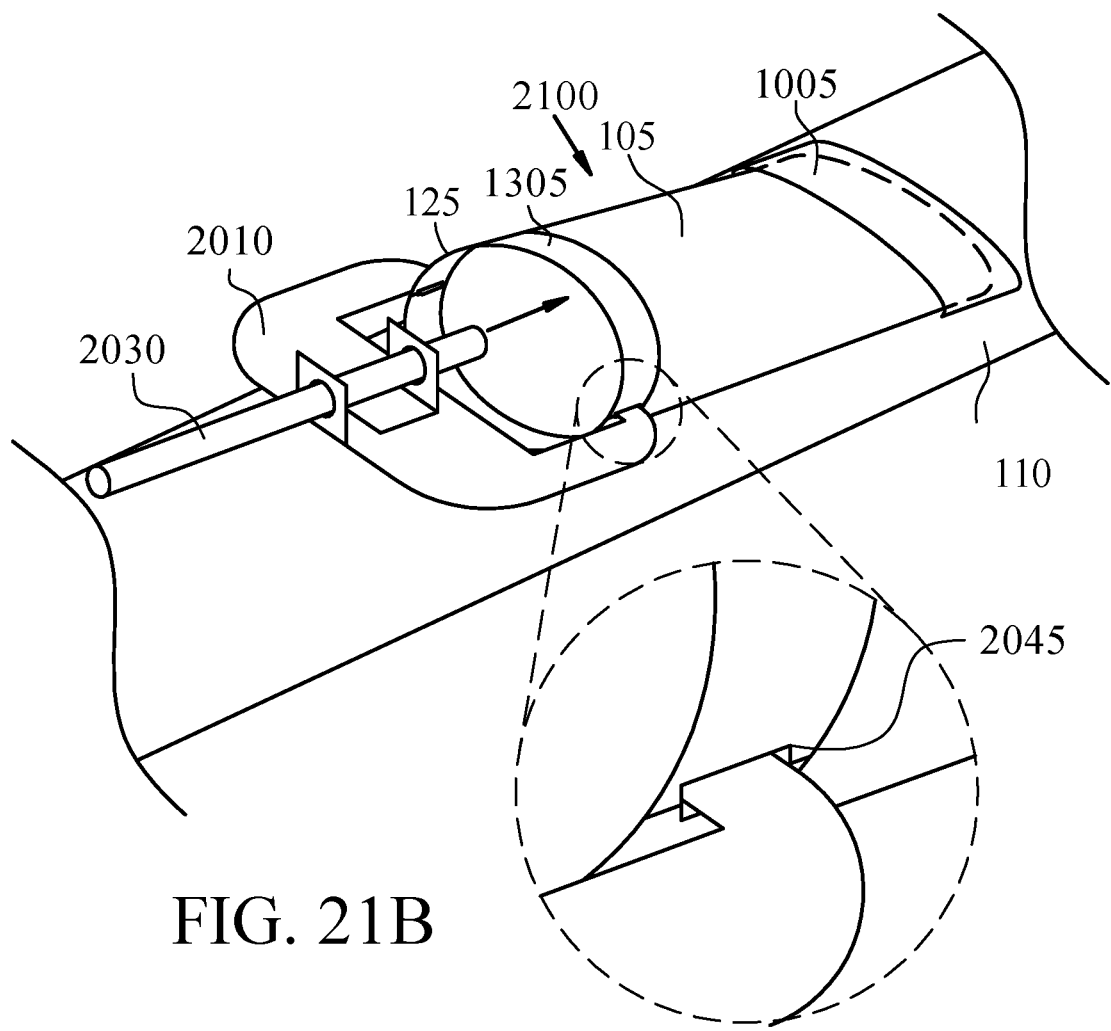
Figure 21C:
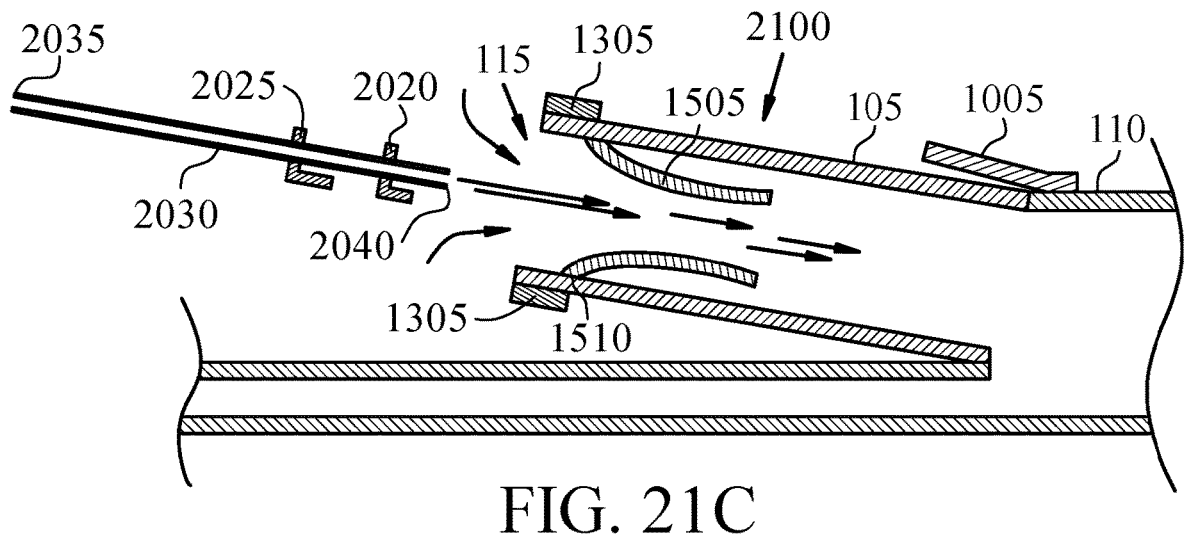
Figure 21D:
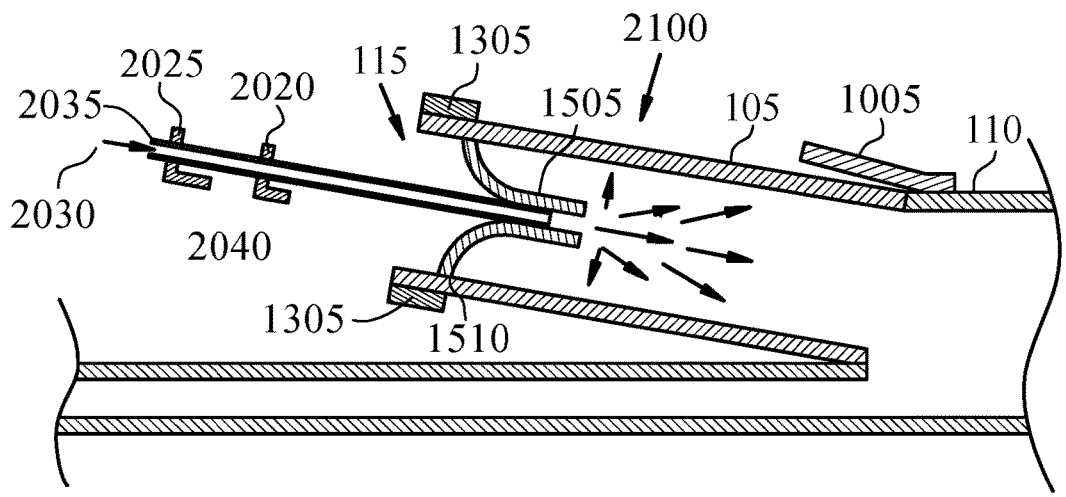

Some valve embodiments may be couple with an adaptor that allows rapid inflation at lower pressure then adjust to allow high pressure inflation. FIG. 21A shows an exploded view of one possible adaptor embodiment, adaptor arrangement 2105, which includes holder 2110 and inflation tube 2130. FIG. 21B-21D show valve arrangement 2100 coupled with adaptor arrangement 2105. FIG. 21C-21D show sectional views of adaptor arrangement 2105 in a high volume low pressure rapid inflation configuration and a high pressure low volume configuration respectively.

Valve arrangement 2100 includes chute 105, inflatable object 110, one-way valve 1505, cover element 1005 connect in a similar fashion as valve arrangement 1500 and resilient members 1305 connect in a similar fashion as valve arrangement 1300. Valve arrangement 2100 also includes chute slots 2145 located on opposites sides of chute 105 where side edges 1315 from opposite resilient members 1305 meet (FIG. 21B).

Inflation tube 2130 is a hollow tube that includes first end 2135 and second end 2140.

Inflation tube 2130 is of sufficient length that when in the high pressure configuration (FIG. 21D) second end 2140 will extend past the seal created by the inside surfaces of one-way valve 1505 or completely bypass one-way valve 1505. Inflation tube 2130 has a diameter of sufficient size to allow fluid to flow freely through but small enough to allow easy entry past one-way valve 1505 in the closed position. Inflation tube 2130 can be made from plastic or any material rigid enough so that fluid passing through can be directed towards the center of outside opening 115.

Holder 2110 is a flat C shape with two anchor tabs 2115. Holder 2110 also includes front tab 2120 and back tab 2125 that are perpendicular to rest of holder 2110. Front tab 2120 and back tab 2125 include holes that are large enough to accommodate inflation tube 2130. Front tab 2120 and back tab 2125 are located a distance away from each other and are oriented so that when inflation tube 2130 passes through the holes in both front tab 2120 and back tab 2125, fluid traveling through inflation tube 2130 will be directed approximately towards the center of outside opening 115. Anchor tabs 2115 are a size and shape that fits inside chute slots 2145. Anchor tabs 2115 are located at the tips of the C shape facing each other at a distance apart that is shorter in length then long edge 1310 of resilient member 1305. Therefore, when anchor tabs 2115 are inserted into chute slots 2145, resilient members 1305 are forced into opposing arc shapes holding outside edge 125 in an open position.

Holder 2110 can be cut from a single flat sheet of plastic and front tab 2120 and back tab 2125 can be bent up from the flat pattern. Holder 2110 can also be made from any other material or method known in the art that would allow enough rigidity to orient inflation tube 2130 relative to valve arrangement 2100.

To inflate, fluid is propelled through inflation tube 2130 from first end 2135 to second end 2140. The flow of fluid can be from the user blowing on first end 2135, or by connecting first end 2135 to a manual pump, hair dryer, air tank, bellows, etc. In the rapid inflation configuration (FIG. 21C), inflation tube 2130 is located so that second end 2140 is located outside of chute 105 a distance away from outside opening 115 thus producing rapid inflation discuss in previous embodiments. As pressure builds in inflatable object 110 and it is difficult to force more fluid into outside opening 115 past one-way valve 1505, inflation tube 2130 can be slide into a high pressure low volume configuration (FIG. 21D). In the high pressure low volume configuration, second end 2140 bypasses the seal created by one-way valve 1505. In this configuration one-way valve 1505 creates a seal around inflation tube 2130 so that all fluid passing through inflation tube 2130 will go directly into chute 105. When the desired pressure is obtained, adaptor arrangement 2105 can be uncoupled from valve arrangement 2100 and chute 105 can be rolled into a closed position similar to valve arrangement 1000.

In some valve embodiments inflation tube 2130 may include a way to allow fluid to flow from first end 2135 to second end 2140, but prevent fluid from traveling the opposite direction. This can assist with inflation in the high pressure low volume configuration. The one directional flow can be created with any method known in the art.

Figure 22A:
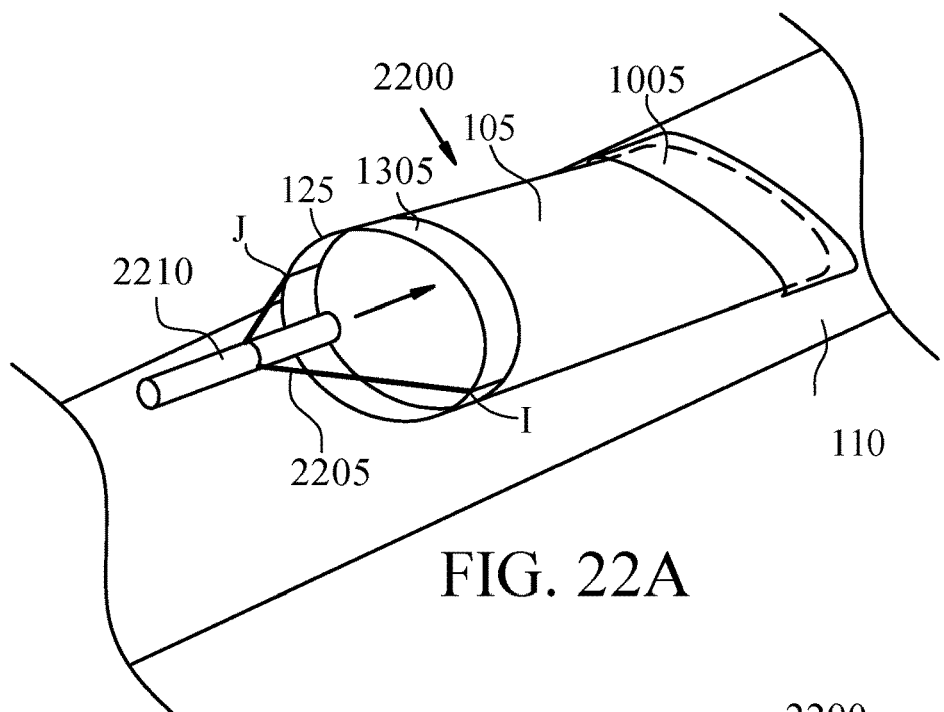
FIG. 22A-22C
illustrate views of a valve embodiment with an inflation tube and support members.

Some valve embodiment may include an inflation tube and attachment member that assists a user during inflation. FIG. 22A shows an isometric view of valve arrangement 2200. Valve arrangement 2200 has the following elements connected in similar fashions to previously described embodiments; chute 105 is connected to inflatable object 110 along inside edge 130, two resilient members 1305 are connected to opposite sides of outside edge 125, and one-way valve 1505 connects to the inside of chute 105. Additionally, valve arrangement 2200 includes support member 2205 and resilient tube 2210.

Figure 22B:
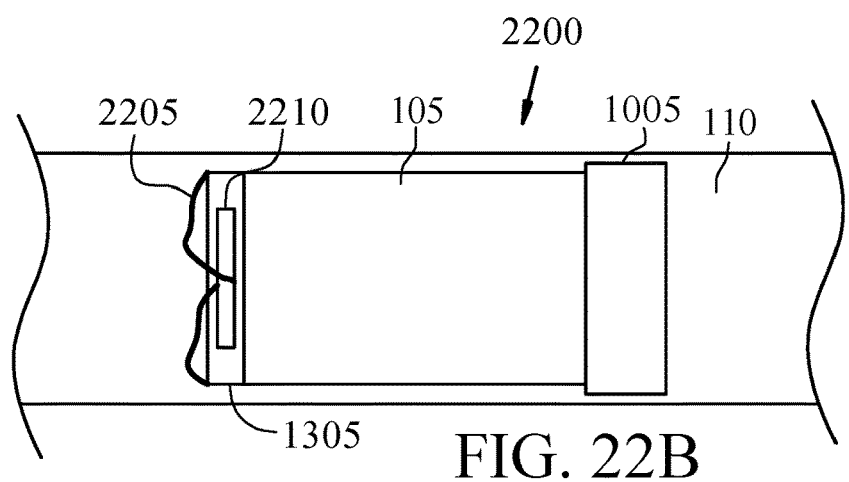

FIG. 22A shows points I and J located on opposite sides of outside edge 125 where side edges 1315 from each resilient members 1305 meet respectively. Support member 2205 is connected at one end to point I and at the opposite end to point J. Support member 2205 may be made from any flexible line or ribbon like material know in the art. Resilient tube 2210 is a hollow tube that is connected along its outside length to the middle of support member 2205. Resilient tube 2210 is rigid enough to direct fluid towards the center of outside opening 115 and flexible enough to be rolled up with chute 105 into a closed position. To roll valve arrangement 2200 into a closed position, resilient tube 2210 can be aligned with resilient members 1305 (FIG. 22B) then rolled into a closed position in a similar fashion described in previous embodiments.

Resilient tube 2210 is of sufficient length so that it can be moved into a high pressure configuration similar to inflation tube 2130 in FIG. 21D. One end of resilient tube 2210 will pass the seal created by the inside surfaces of one-way valve 1505 or completely bypass one-way valve 1505. Resilient tube 2210 has a diameter of sufficient size to allow fluid to flow freely through but small enough to allow easy entry one-way valve 1505 when one-way valve 1505 is in the closed position.

When resilient tube 2210 is pulled away from outside edge 125 then support member 2205 will tighten and force chute 105 into a rapid inflation position (FIG. 22A). Support member 2205 is a sufficient length that when pulled into a rapid inflation position resilient tube 2210 will be a desirable distance away from outside opening 115 to allow rapid inflation when fluid passes through resilient tube 2210. Fluid can be forced through resilient tube 2210 from various sources such as, user's breath, manual pump, hair dryer, air tank, bellows, etc.

Figure 22C:
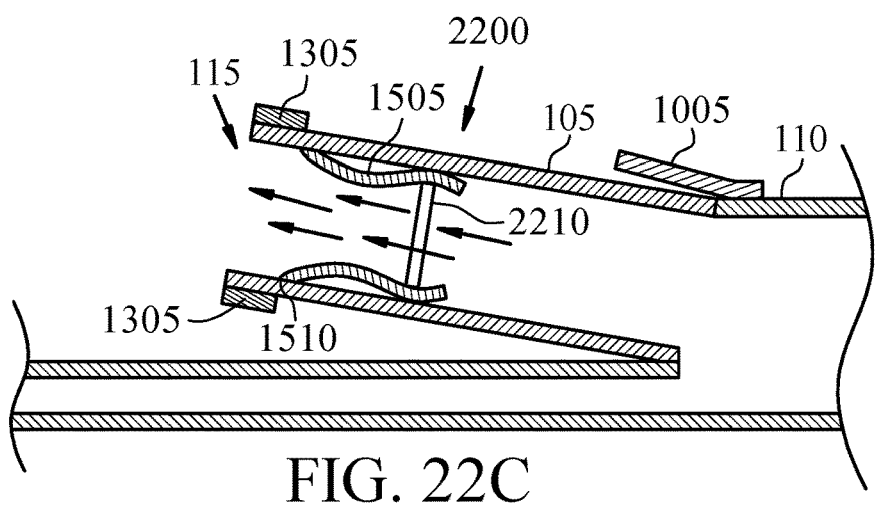

FIG. 22C shows how resilient tube 2210 can be used to open one-way valve 1505 and allow rapid deflation. Other deflation methods previously described can also be achieved with valve arrangement 2200.

Figure 23A:
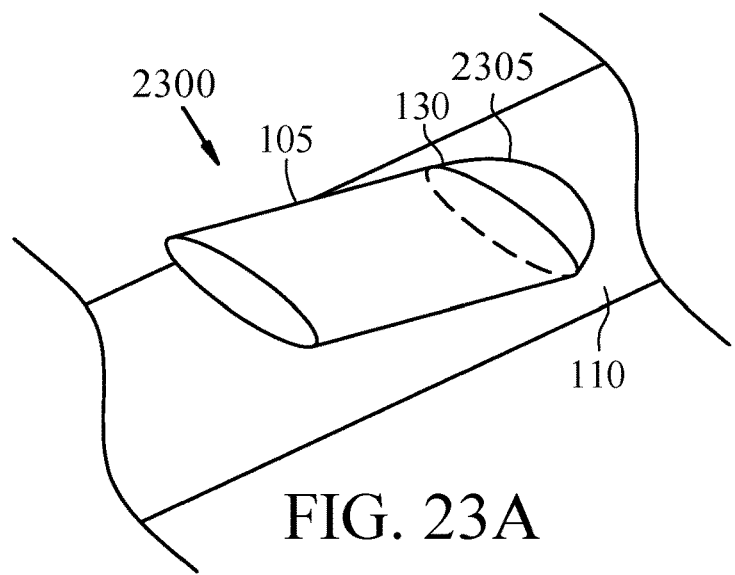
FIG. 23A-23B
illustrate views of a valve embodiment with a chute elbow to improve fluid flow into an inflatable object.
Figure 23B:
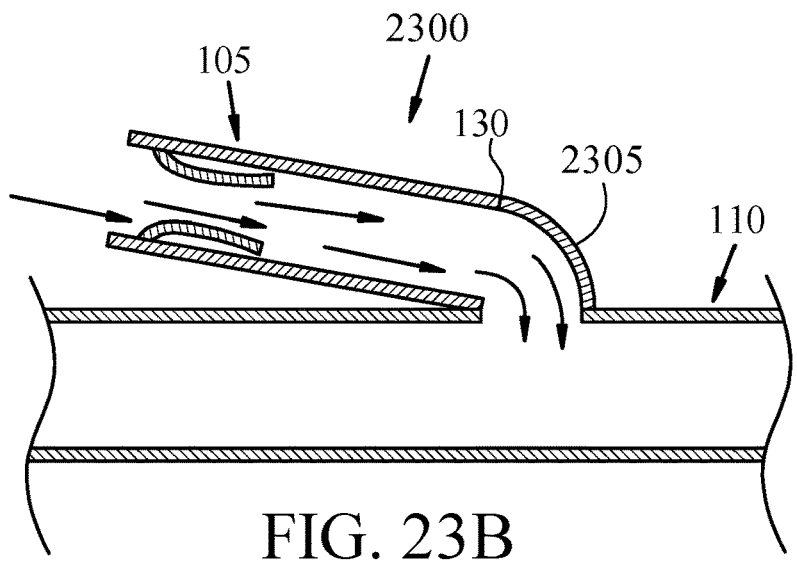

Some embodiments have an elbow where chute 105 connects to inflatable object 110 to direct fluid flow during inflation. FIG. 23A-23B show a perspective and sectional view of valve arrangement 2300. Chute elbow 2305 is a wedge shaped element that has one edge connected to inflatable object 110 and the other connected to chute 105 along inside edge 130. A portion of inside edge 130 is connected to chute elbow 2305 and the rest of inside edge 130 is connected to inflatable object 110. Connections may be made by any technique known in the art. Chute elbow 2305 may be made from a similar material to chute 105 or inflatable object 110. FIG. 23B Shows how chute elbow 2305 allows fluid to flow through chute 105 and into inflatable object 110.

Some embodiments that include chute elbow 2305 may also have attachment elements along the side/sides of chute elbow 2305 to minimize the bump in the closed position that is created from the extra material added by chute elbow 2305.

Figure 24:
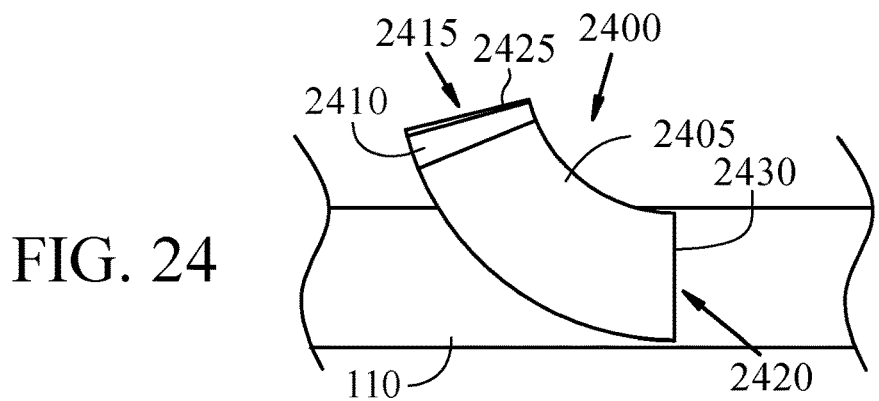
FIG. 24
illustrate an exemplary embodiment of a valve with a curved chute.

FIG. 24 shows valve arrangement 2400 with chute 2405 and resilient member 2410.

Chute 2405 is a flexible tube that includes outside opening 2415, inside opening 2420, outside edge 2425, and inside edge 2430. Chute 2405 may be made of a similar material as inflatable object 110. Chute 2405 is connected to inflatable object 110 along inside edge 2430 in a similar fashion that chute 105 is along inside edge 130. Resilient member 2410 is similar to resilient member 1305 but resilient member 2410 has an isosceles trapezoid shape with the shorter side closer to the smaller radius side of the curved chute. The curve of chute 2405 allows inside opening 2420 to be positioned on an offset angle relative to inside edge 2430. The isosceles trapezoid shape of resilient member 2410 allows rolled chute 105 to reach a closed position evenly against inside edge 2430.

Some embodiments similar to valve arrangement 2400 may include a cover element similar to valve arrangement 1000.

Figure 25A:
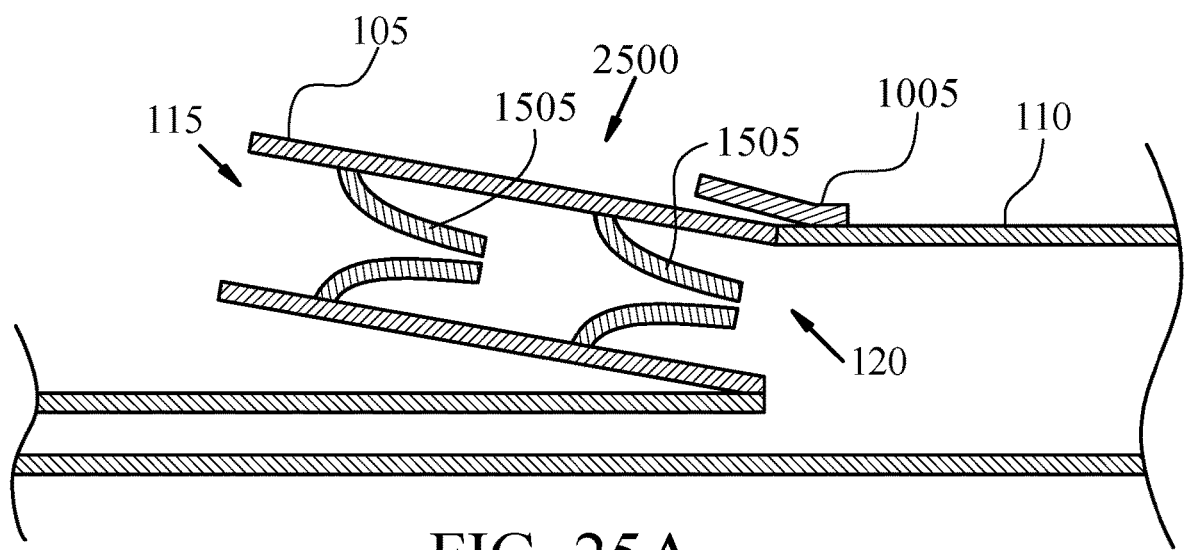
FIG. 25A-25B
illustrate views of a valve embodiment with multiple upper and lower valve sheets.
Figure 25B:
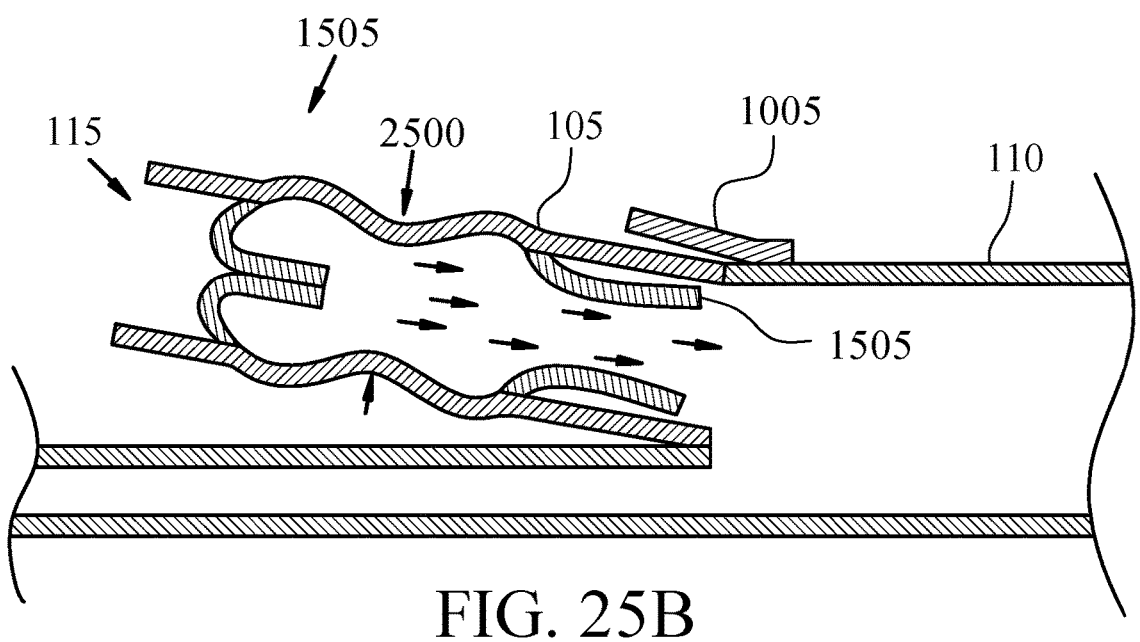

FIG. 25A-25B show a sectional views valve arrangement 2500. valve arrangement 2500 is similar to valve arrangement 1500 with the addition of a second one-way valve 1505. Second one-way valve 1505 is position closer to inside opening 120. FIG. 25B shows that by pushing on chute 105 in the area between the sets of one-way valves 1505 the fluid in that space is forced into inflatable object 110. This can be done to increase the pressure inside inflatable object 110 beyond the pressure created from projecting a stream of fluid toward outside opening 115. Even with multiple one-way valves 1505, chute 105 can still obtain either straight inverted position or rolled inverted position.

Figure 26A:
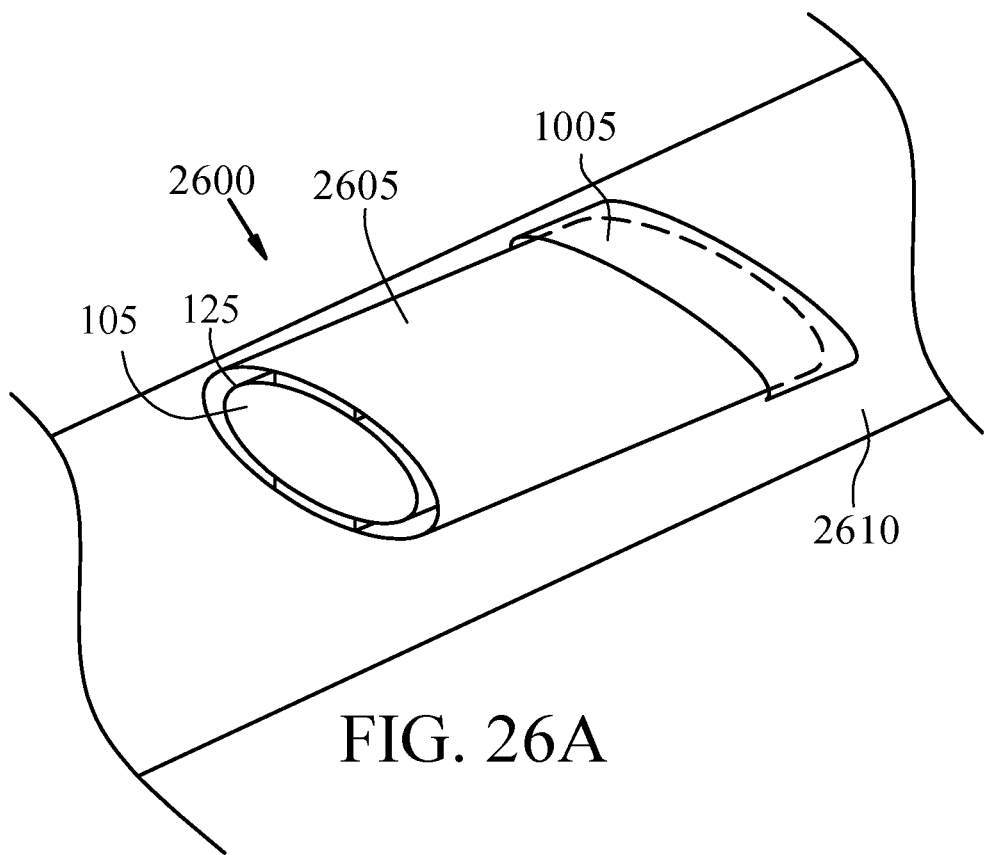
FIG. 26A-26D
illustrate views of a valve embodiment that accommodates an inflatable object with a bladder and outer shell.
Figure 26B:
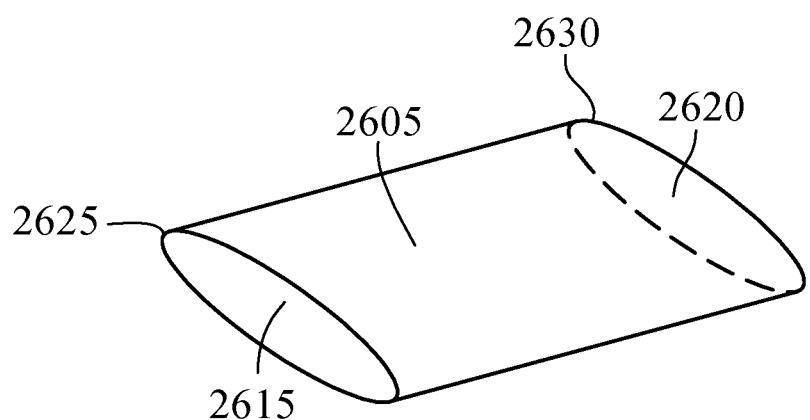

Some inflatable objects include an inflatable bladder and an outer shell such as an inflatable traction kite, towable water toys, etc. FIG. 26A shows a perspective view of valve arrangement 2600 with chute 105 inside chute shell 2605. Here inflatable object 110 is used as a bladder inside outer shell 2610. Outer shell 2610 may be made from a material that offers protection and/or inelastic properties to maintain geometry control during high pressure. Outer shell 2610 may be made from a material such as nylon, polyester, vinyl, polyethylene terephthalate, etc. FIG. 26B shows chute shell 2605 as a flexible tube that includes outside opening 2615, inside opening 2620, outside edge 2625, and inside edge 2630. Chute shell 2605 may be made from a similar material as outer shell 2610. Chute shell 2605 may be connected to outer shell 2610 along outside edge 2625 with any technique known in the art. Although FIG. 26A shows outside edge 125 in the same axial plane as outside edge 2625 in some embodiments they may be offset and outside edge 125 may extend past outside edge 2625 or vice versa. Cover element 1005 is connected to outer shell 2610 in the same fashion that it was connected to inflatable object 110 in valve arrangement 1000. In valve arrangement 2600 cover element 1005 may be made from a similar material to outer shell 2610.

Figure 26C:
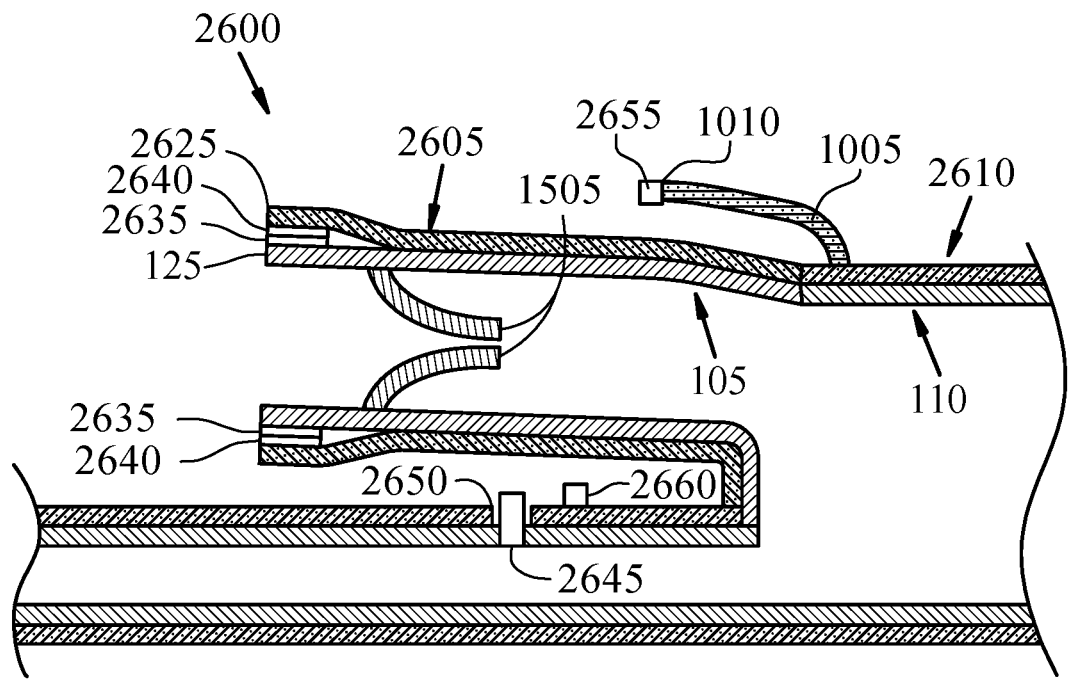

FIG. 26C shows a sectional view of valve arrangement 2600. Attachment element 2640 is located along the inside circumference of chute shell 2605 near outside edge 2625. Attachment element 2635 is located along the outside circumference of chute 105 in a position that aligns with attachment element 2640. Attachment elements 2635 and 2640 may be a continuous element or be a number of segments. Attachment element 2655 is connected to cover element 1005 along front edge 1010. Attachment element 2660 is connected to outer shell 2610 in a location that will align with attachment element 2655 when valve arrangement 2600 is in the closed position. Attachment elements 2635, 2640, 2655, and 2660 may be any type of attachment element known in the art and may include hook and loop, snaps, buttons, buckles, magnets, zipper, etc. Secondary valve 2645 can be any type of traditional inflatable valve and is connected to inflatable object 110 and passes through valve cutout 2650. FIG. 26C shows secondary valve 2645 located below the area that is covered by chute shell 2605 in an unrolled position. In other embodiments one or more secondary valves 2645 may be located anywhere on inflatable object 110, while other embodiments may not contain any secondary valves 2645.

Figure 26D:
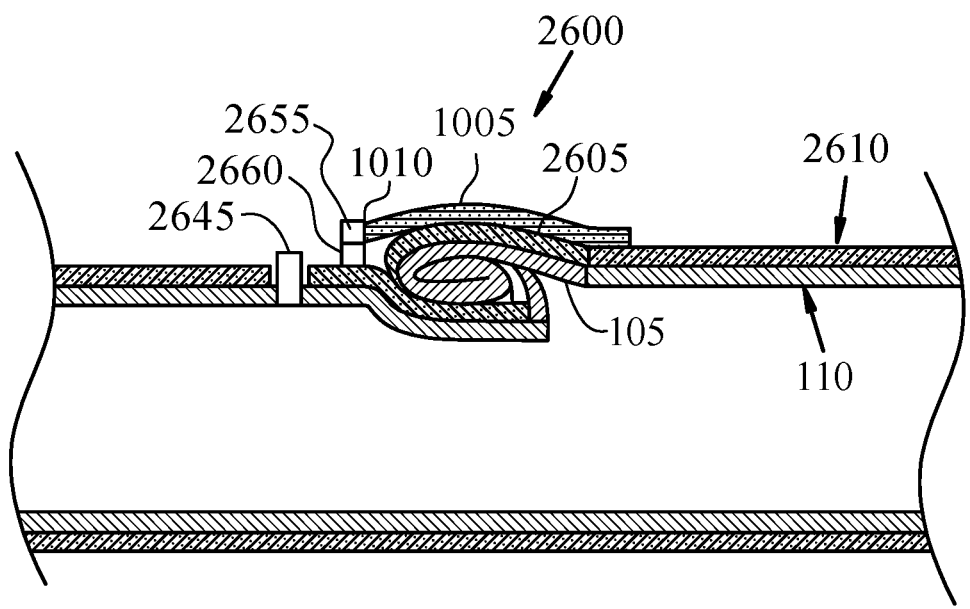

The following is a possible method to achieve high pressure in with valve arrangement 2600. Starting from the secured closed position (FIG. 26D), attachment element 2655 and 2660 are disconnected and chute shell 2605 is unrolled (FIG. 26C). A stream of fluid is projected at outside opening 115, ensuring the stream originates from a distance away from outside opening 115. When it is difficult to force more fluid into outside opening 115 past one-way valves 1505 with the stream of fluid, chute shell 2605, with chute 105 inside, can be fully rolled with a downwards roll into a closed position. This will force at least a portion of the fluid in chute 105 into inflatable object 110. When chute shell 2605 is rolled into a closed position and self-lock. At this point secondary valve 2645 will be exposed. Once attachment element 2655 and 2660 are reconnected, fluid can be forced into secondary valve 2645 with any technique known in the art until the desired fluid pressure is reached, then secondary valve 2645 can be closed.

To deflate using valve arrangement 2600 from a high pressure state a user could simply open secondary valve 2645 or the following method may be used. Open secondary valve 2645 to release the high pressure then disconnect attachment elements 2635 and 2640 and unroll chute shell 2605. Chute shell 2605 and chute 105 can be inverted together into a straight inverted position or rolled inverted position to allow rapid deflation.

Figure 27:
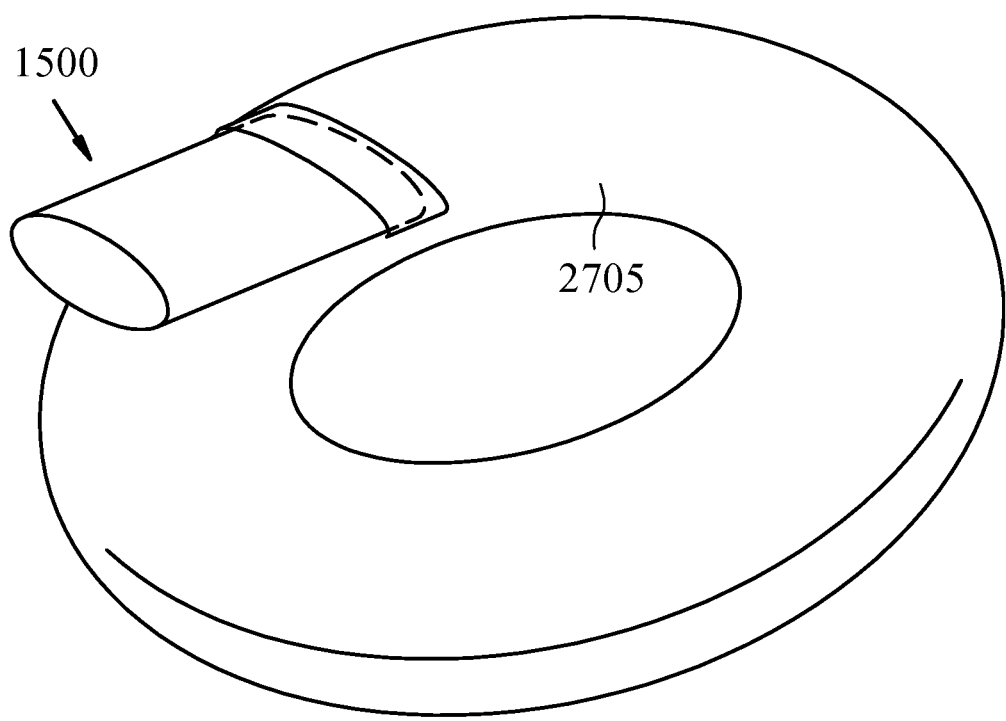
FIG. 27
illustrates a valve embodiment designed to an inflatable tube pool float
Figure 28:
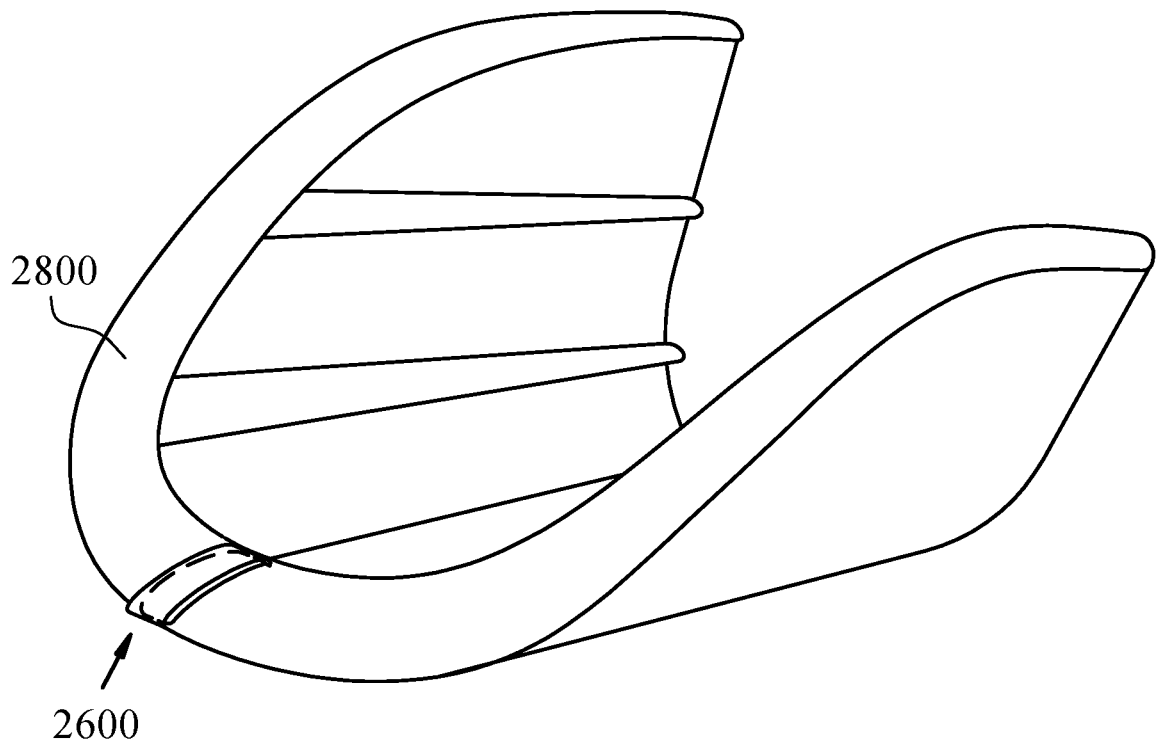
FIG. 28
illustrates a valve embodiment designed to an inflatable traction kite.
Figure 29:
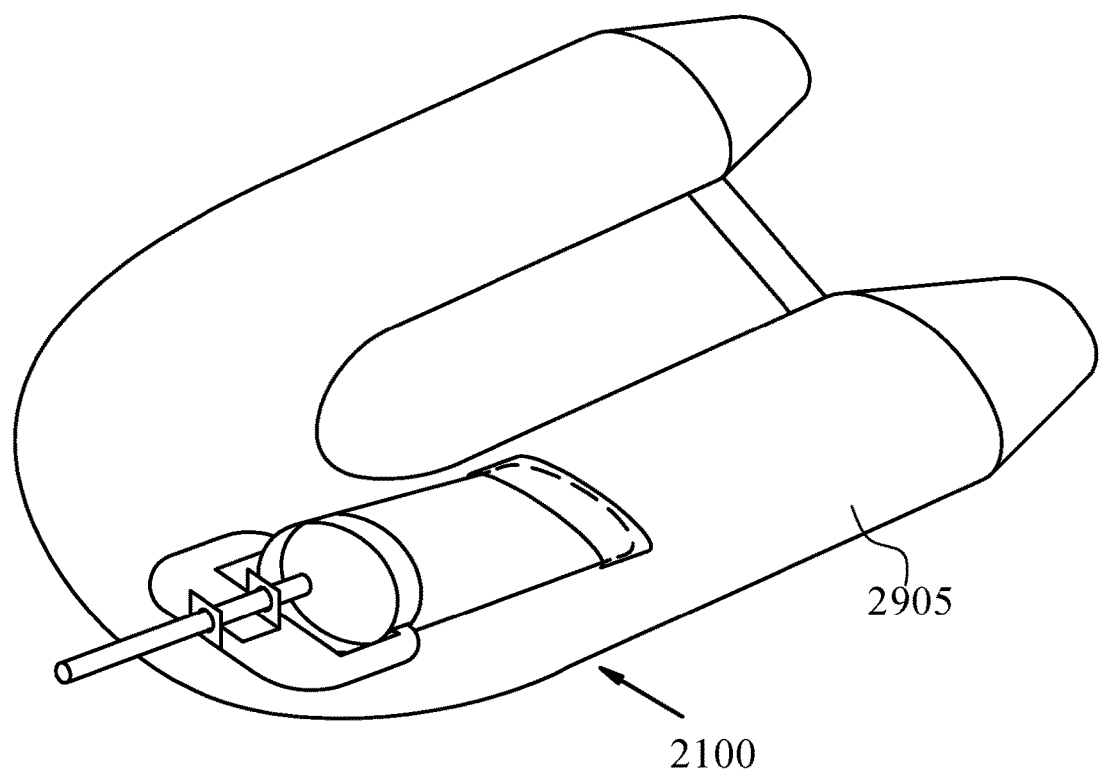
FIG. 29
illustrates a valve embodiment designed to an inflatable raft.

Valve embodiments may be integrated into a variety of inflatable objects such as pool float 2705 (FIG. 27), traction kite 2805 (FIG. 28), raft 2905 (FIG. 29), air mattress 3005 (FIG. 30), inflatable toys, towable water toys, inflatable furniture, inflatable paddle boards, inflatable kayaks, inflatable structures, etc. The following is a summary of some advantages present in valve embodiments;
  (1) Self-locking in the closed position without the need for fasteners.
  (2) Allows rapid inflation and deflation of an inflatable object, with or without a pump.
  (3) Performance and convenience are maintained for a range of chute sizes.
  (4) Improved sanitation since the user does not have to put their month on the valve.
  (5) Unwanted debris that gets inside the inflatable object can easily be removed.
  (6) Improved serviceability as the inflatable object, or a portion of, can be flipping inside out allowing;
    i. the inside surface to be cleaned.
    ii. improved sanitation and prevention of material breakdown caused from moisture and/or bacterial.
    iii. repairs can be made to the inside of the inflatable object.
  (7) Lightweight, low profile, and flexible
    i. A closed position that is low profile and leaves the surface of the inflatable object with minimal distortion. This improves aesthetics, aerodynamics, hydrodynamics, and reduces stress concentrations.
    ii. (Inflated) Reduces the risk of damage, or harm, during a collision, to both the valve and the object/being it collides with.

iii. (Deflated) reduces risk of damaging to the inflatable object during storage and transportation.

The invention claimed is:

1. An inflatable object having a curved section and an improved valve, said improved valve comprising a flexible chute that has an inner edge connected to said inflatable object and is rollable and unrollable between a rolled-up closed position and an unrolled open position, said inner edge being connected to said inflatable object along said curved section at a location and orientation operable to use pressure inside said inflatable object to resist unrolling of said flexible chute from the rolled-up closed position;
   wherein said curved section of said inflatable object has an axis, an axial plane perpendicular to said axis, and a curved line at which said curved surface intercepts said axial plane, wherein said inner edge of the flexible chute follows said curved edge and is offset from the axial plane by an offset angle that is less than 90 degrees.

2. The inflatable object of claim 1 comprising a one-way valve inside the flexible chute, said one-way valve being invertible by pulling an outside edge of said flexible chute overtop a remainder of said chute to situate said one-way valve outside said chute.

3. The inflatable object of claim 1 comprising a one-way valve inside the flexible chute, said one-way valve being invertible by inward or outward rolling together of said flexible chute and said one-way valve from an outside edge of said flexible chute.

4. The inflatable object of claim 1 comprising a pocket cover connected to the inflatable object in a position creating a pocket for rolled receipt of the flexible chute within said pocket in the rolled-up closed position.

5. The inflatable object of claim 4 comprising a one-way valve inside the flexible chute.

6. The inflatable object of claim 1 comprising a one-way valve inside the flexible chute, wherein at least a portion of the one-way valve and at least a portion of the flexible chute integrally defined by a singular unitary sheet of material.

7. The inflatable object of claim 1 comprising a one-way valve inside the flexible chute, wherein said flexible chute and said one-way valve are at least partially formed by an upper sheet of material and a lower sheet of material, each of which is folded inwardly over itself at an end thereof so that an inwardly folded-flap of each sheet forms a respective half of the one-way valve, while a remainder of each sheet forms a respective half of the flexible chute, and the upper and lower sheets are seamed together along a plurality of side edges.

8. The inflatable object of claim 1 comprising a one-way valve inside the flexible chute, wherein said flexible chute and said one-way valve are defined by a singular elongated sheet of material, a first portion of which spans around a full perimeter of said inflatable object, and a second portion of which defines first and second folded-over ends of the singular elongated sheet from which a plurality of inwardly folded flaps extend toward the first portion of singular elongated sheet, said singular elongate sheet having a length measured between said folded-over ends that exceeds a perimeter measurement of said inflatable object, said folded-over ends of the singular elongated sheet being placed over one another with the inwardly folded flaps of said singular elongated sheet mated together, and a plurality of side edges of said singular elongated sheet being seamed together at the second portion thereof from the folded-over ends of the singular elongated sheet to a location past a mating position of said plurality of flaps.

9. The inflatable object of claim 1 further comprising a holder operable to hold an outside opening of the flexible chute in an open position.

10. The inflatable object of claim 8 in further combination with an inflation tube, wherein said holder is also operable to orient the inflation tube to direct fluid flow therefrom toward an outside opening of the flexible chute.

11. The inflatable object of claim 9 wherein the flexible chute comprises a plurality of resilient members at an outside opening thereof and a plurality of slots on opposite sides of said flexible chute where a plurality of side edges of the resilient member meet, and the holder comprises a plurality of anchor tabs spaced apart by a distance shorter than a length a long edge of of the resilient member, whereby insertion of said plurality of anchor tabs into said slots forces the resilient members into an opposing arc shape holding the outside opening of the flexible chute in the open position.

12. The inflatable object of claim 9 wherein said holder comprises at least one opening that is sized to accommodate insertion of an inflation tube in said at least one opening, and is oriented to direct a fluid flow from said inflation tube toward an outside opening of the flexible chute.

13. The inflatable object of claim 1 further comprising, a one-way valve inside the flexible chute that is sized to enable insertion of a nozzle of a hair dryer into said one-way valve and to form a seal around said nozzle.

14. A method of deflating the inflatable object of claim 1, wherein said flexible chute further comprises a one-way valve therein, wherein said method comprises inverting said one-way valve by either (a) pulling an outside edge of said flexible chute overtop of an external surface of said chute to relocate said one-way valve to a non-restrictive position outside said chute to enable rapid deflation of the inflatable object through said chute, or (b) rolling together of said flexible chute and said one-way valve inwardly or outwardly from an outside edge of said flexible chute.

15. A method of inflating the inflatable object of claim 1 wherein said flexible chute further comprises a one-way valve therein, wherein the method comprises:
   (a) propelling fluid through an inflation tube from a first end thereof to a second end thereof with the inflation tube in a low-pressure inflation configuration positioned outside the flexible chute with the second end of the inflation tube at a spaced distance away from an outside end of the flexible chute;
   (b) subsequently sliding the second end of the inflation tube into the flexible chute and at least partially through the one-way valve into a position in which the one-way valve forms a seal around the inflation tube, thereby achieving a high-pressure inflation configuration in which the seal created by the one-way valve is bypassed by the second end of the inflation tube; and
   (c) then propelling additional fluid into the inflatable object through the inflation tube while in the high-pressure configuration.

16. A method of producing the inflatable object of claim 5 comprising: obtaining two sheets of material; folding each sheet partially over itself to create a folded-over end of the sheet from which an inwardly folded flap extending over a remainder of the sheet toward an opposing unfolded end thereof, with the sheets placed together face-to-face with the inwardly folded flaps between them, seaming said first and second sheets together along a plurality of side edges thereof from the folded-over ends of said sheets toward the opposing unfolded ends thereof, during which both the inwardly folded flap and remainder of each sheet is seamed to the inwardly folded flap and remainder of the other sheet; whereby the seamed-together flaps form the one-way valve and the seamed-together remainders form the flexible chute surrounding the one-way valve.

17. A method of producing the inflatable object of claim 5 comprising:

obtaining an elongated singular sheet of material;

using a first portion of said elongated singular sheet of material to wrap around or define a perimeter of the inflatable object; and using a second portion of said elongated singular sheet of material to form the flexible chute and the one-way valve therein;

wherein fabrication of the flexible chute and the one-way valve comprises:

folding the elongated singular sheet partially over itself at both a first and second end to create first and second folded-over ends of the elongated singular sheet forming a plurality of inwardly folded flaps extending toward the first portion of the elongated singular sheet;

with the first and second folded-over ends of the elongated singular sheet placed over one another with the inwardly folded flaps in a mated-together relation with one another, seaming a plurality of side edges of the singular unitary sheet together from the folded-over ends thereof to a location past the inwardly-folded flaps.

\* \* \* \* \*